US008712351B2

(12) United States Patent  
Kobayashi et al.

(10) Patent No.: US 8,712,351 B2
(45) Date of Patent: *Apr. 29, 2014

(54) RECEPTION METHOD AND RECEPTION APPARATUS

(71) Applicant: Harris Corporation, Melbourne, FL (US)

(72) Inventors: Kiyotaka Kobayashi, Tokyo (JP); Yutaka Murakami, Kanagawa (JP); Masayuki Orihashi, Chiba (JP)

(73) Assignee: Harris Corporation, Melbourne, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/889,614

(22) Filed: May 8, 2013

(65) Prior Publication Data

US 2013/0243132 A1 Sep. 19, 2013

Related U.S. Application Data

(63) Continuation of application No. 13/564,465, filed on Aug. 1, 2012, now Pat. No. 8,463,213, which is a continuation of application No. 13/023,380, filed on Feb. 8, 2011, now Pat. No. 8,260,228, which is a continuation of application No. 11/937,422, filed on Nov. 8, 2007, now Pat. No. 7,917,102, which is a continuation of application No. 10/566,682, filed as application No. PCT/JP2004/011505 on Aug. 4, 2004, now Pat. No. 7,324,481.

(30) Foreign Application Priority Data

Aug. 7, 2003 (JP) .................................. 2003289060
Mar. 12, 2004 (JP) .................................. 2004071322

(51) Int. Cl.
*H04B 17/02* (2006.01)
*H04L 27/06* (2006.01)

(52) U.S. Cl.
USPC ............................ 455/132; 455/138; 375/340

(58) Field of Classification Search
USPC ................ 455/130, 132, 136, 138, 272, 293; 370/332, 334, 335; 375/316, 347, 340
See application file for complete search history.

(56) References Cited

U.S. PATENT DOCUMENTS 5,862,460 A 1/1999 Rich
6,205,189 B1 3/2001 Ha (Continued)

FOREIGN PATENT DOCUMENTS

JP 11145932 5/1999
JP 2002374224 12/2002

(Continued)

OTHER PUBLICATIONS

Japanese Office Action dated Oct. 2, 2007 with English translation, pp. 1-2.

(Continued)

*Primary Examiner* — Sonny Trinh
(74) *Attorney, Agent, or Firm* — Allen, Dyer, Doppelt, Milbrath & Gilchrist, P.A.

(57) ABSTRACT

A radio transmitting apparatus that has a plurality of antennas and changes the number of modulated signals transmitted simultaneously according to the propagation environment and so forth. A transmission power changing section 12 of a radio transmitting apparatus of the present invention adjusts the pilot symbol signal level so as to match the data symbol composite signal level according to the number of transmit modulated signals set by a modulated signal number setting section 11. By this means, the operating range of received pilot symbols and the operating range of received data symbols become approximately the same on the receiving side, enabling pilot symbol quantization error to be reduced. As a result, the precision of radio wave propagation environment estimation, time synchronization, and frequency offset estimation using pilot symbols improves, and consequently data reception quality improves.

21 Claims, 33 Drawing Sheets

(56) References Cited

U.S. PATENT DOCUMENTS

| | | | |
|---|---|---|---|
| 6,738,443 | B1 | 5/2004 | Bohnke |
| 6,738,448 | B1 | 5/2004 | Okamoto |
| 6,785,520 | B2 | 8/2004 | Sugar |
| 6,891,817 | B2 | 5/2005 | Miya |
| 6,993,299 | B2 | 1/2006 | Sugar |
| 7,042,955 | B2 | 5/2006 | Benning |
| 7,298,207 | B2 | 11/2007 | Yim |
| 7,308,033 | B2 | 12/2007 | Yu |
| 7,548,590 | B2 | 6/2009 | Koller |
| 7,643,453 | B2 | 1/2010 | Webster |
| 7,746,943 | B2 | 6/2010 | Yamaura |
| 7,809,020 | B2 | 10/2010 | Douglas |
| 7,864,903 | B2 | 1/2011 | Murakami |
| 8,027,651 | B2 | 9/2011 | Stogner |
| 8,144,799 | B2 | 3/2012 | Murakami |
| 2002/0191535 | A1 | 12/2002 | Sugiyama |
| 2003/0043732 | A1 | 3/2003 | Walton |
| 2010/0111203 | A1 | 5/2010 | Aoki |

FOREIGN PATENT DOCUMENTS

| | | |
|---|---|---|
| JP | 2003037536 | 2/2003 |
| JP | 2005210690 | 8/2005 |
| JP | 2007515861 | 6/2007 |
| WO | 0189124 | 11/2001 |
| WO | 2002103926 | 12/2002 |
| WO | 2005046113 | 5/2005 |

OTHER PUBLICATIONS

Japanese Notice of Reasons for Rejection dated Nov. 9, 2010, no English translation available, pp. 1-5.

Japanese Office Action dated Apr. 26, 2001, no English translation available, pp. 1-4.

Japanese Office Action dated Feb. 14, 2006, no English translation available, pp. 1-2.

Japanese Office Action dated Nov. 1, 2011, no English translation available, pp. 1-4.

PCT International Search Report dated Nov. 22, 2004, pp. 1-82.

T. Aoki et al, "New preamble structure for AGC in a MIMO-OFDM system", IEEE 802.11-04/046r1, Jan. 2004, pp. 1-14.

L. M. Davis, et al. "System architecture and ASICs for a MIMO 3GPP-HSDPA receiver", Proceeding of Vehicular Technology Conference (WC), IEEE, vol. 2, Apr. 2003, pp. 818-822.

Kurosaki et al, "100Mbits/s SDM-COFDM over MIMO channel for broadband mobile communications", Technical Report of IEICE A-P2001-96, RCS2001-135, The Institute of Electronics, Information and Communication Engineers, Oct. 2001, pp. 37-42.

J. Liu et al, "A MIMO system with backward compatibility for OFDM based WLANS", Signal Processing Advances in Wireless Communications, 2003, SPAWC 2003, 4th IEEE Workshop on Jun. 18, 2003, pp. 130-134 (7 pgs. total).

Sugiyama et al, "Development of a novel SDM-COFDM prototype for broadband wireless access systems", IEEE Wireless Communications and Networking 2003, Mar. 20, 2003, pp. 55-60 (9 pgs. total).

V. Tarokh et al, "Space-Time block codes from orthogonal designs", IEEE Transactions on Information Theory, vol. 45, No. 5, Jul. 1999, pp. 1456-1467.

V. Tarokh et al, "Space-Time codes for high data rate wireless communication: performance criterion and code construction", IEEE Transactions on Information Theory, vol. 44, No. 2, Mar. 1998, pp. 744-765.

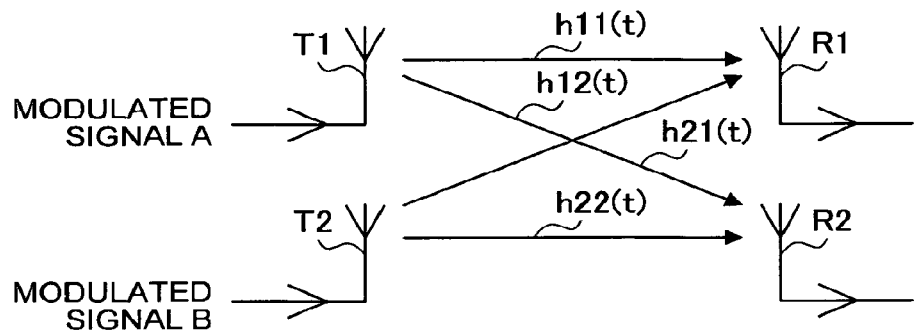
(PRIOR ART)
FIG.1
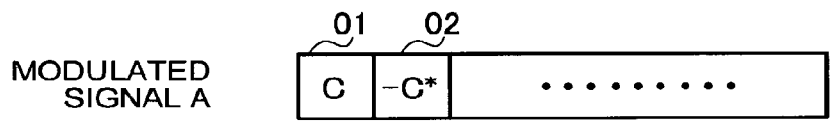
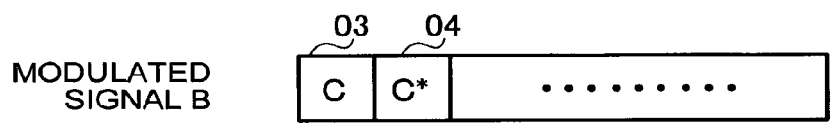
(PRIOR ART)
FIG.2

☐ 101: SIGNAL DETECTION SYMBOL
▨ 102: CONTROL SYMBOL
▩ 103: TRANSMISSION METHOD INFORMATION SYMBOL
▨ 104: RADIO WAVE PROPAGATION ENVIRONMENT ESTIMATION SYMBOL
☐ 105: DATA SYMBOL

} PILOT SYMBOLS

MODULATED SIGNAL A

| TIME | CARRIER 1 | | CARRIER 2 | | CARRIER 3 | | CARRIER 4 | |
|---|---|---|---|---|---|---|---|---|
| | I | Q | I | Q | I | Q | I | Q |
| i | 2.0 | 0 | 0 | 0 | -2.0 | 0 | 0 | 0 |
| ii | 1.0 | 1.0 | -1.0 | -1.0 | -1.0 | -1.0 | 1.0 | 1.0 |
| iii | -1.0 | -1.0 | 1.0 | 1.0 | 1.0 | 1.0 | -1.0 | -1.0 |

FIG.7A

MODULATED SIGNAL B

| TIME | CARRIER 1 | | CARRIER 2 | | CARRIER 3 | | CARRIER 4 | |
|---|---|---|---|---|---|---|---|---|
| | I | Q | I | Q | I | Q | I | Q |
| i | -1.0 | -1.0 | 1.0 | 1.0 | -1.0 | -1.0 | 1.0 | 1.0 |
| ii | 1.0 | 1.0 | -1.0 | -1.0 | 1.0 | 1.0 | -1.0 | -1.0 |
| iii | | | | | | | | |

FIG.7B

MODULATED SIGNAL A

MODULATED SIGNAL B

MODULATED SIGNAL C

MODULATED SIGNAL D

- 101: SIGNAL DETECTION SYMBOL
- 102: CONTROL SYMBOL
- 103: TRANSMISSION METHOD INFORMATION SYMBOL
- 104: RADIO WAVE PROPAGATION ENVIRONMENT ESTIMATION SYMBOL

} PILOT SYMBOLS

- 105: DATA SYMBOL

FIG.11A  MODULATED SIGNAL A

| TIME | CARRIER 1 | | CARRIER 2 | | CARRIER 3 | | CARRIER 4 | |
|---|---|---|---|---|---|---|---|---|
| | I | Q | I | Q | I | Q | I | Q |
| i | 4.0 | 0 | 0 | 0 | 0 | 0 | 0 | 0 |
| i+1 | 2.0 | 2.0 | -2.0 | -2.0 | -2.0 | -2.0 | 2.0 | 2.0 |
| i+3 | -2.0 | -2.0 | 2.0 | 2.0 | 2.0 | 2.0 | -2.0 | -2.0 |

FIG.11B  MODULATED SIGNAL B

| TIME | CARRIER 1 | | CARRIER 2 | | CARRIER 3 | | CARRIER 4 | |
|---|---|---|---|---|---|---|---|---|
| | I | Q | I | Q | I | Q | I | Q |
| i+1 | -2.0 | -2.0 | 2.0 | 2.0 | -2.0 | -2.0 | 2.0 | 2.0 |
| i+3 | 2.0 | 2.0 | -2.0 | -2.0 | 2.0 | 2.0 | -2.0 | -2.0 |

FIG.11C  MODULATED SIGNAL C

| TIME | CARRIER 1 | | CARRIER 2 | | CARRIER 3 | | CARRIER 4 | |
|---|---|---|---|---|---|---|---|---|
| | I | Q | I | Q | I | Q | I | Q |
| i+1 | 2.0 | 2.0 | -2.0 | -2.0 | -2.0 | -2.0 | 2.0 | 2.0 |
| i+3 | -2.0 | -2.0 | 2.0 | 2.0 | 2.0 | 2.0 | -2.0 | -2.0 |

FIG.11D  MODULATED SIGNAL D

| TIME | CARRIER 1 | | CARRIER 2 | | CARRIER 3 | | CARRIER 4 | |
|---|---|---|---|---|---|---|---|---|
| | I | Q | I | Q | I | Q | I | Q |
| i+1 | -2.0 | -2.0 | 2.0 | 2.0 | -2.0 | -2.0 | 2.0 | 2.0 |
| i+3 | 2.0 | 2.0 | -2.0 | -2.0 | 2.0 | 2.0 | -2.0 | -2.0 |

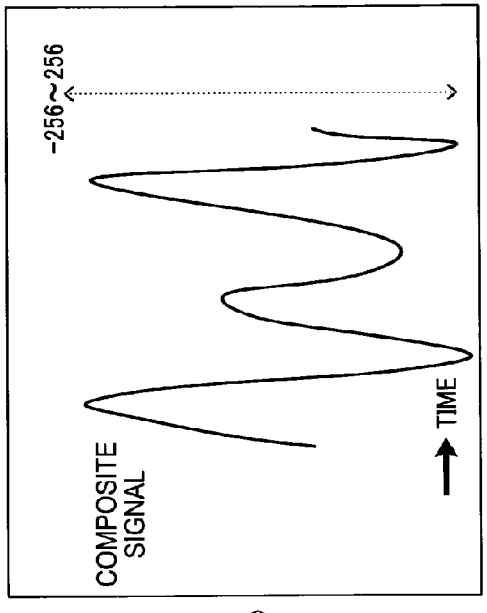
FIG.13A
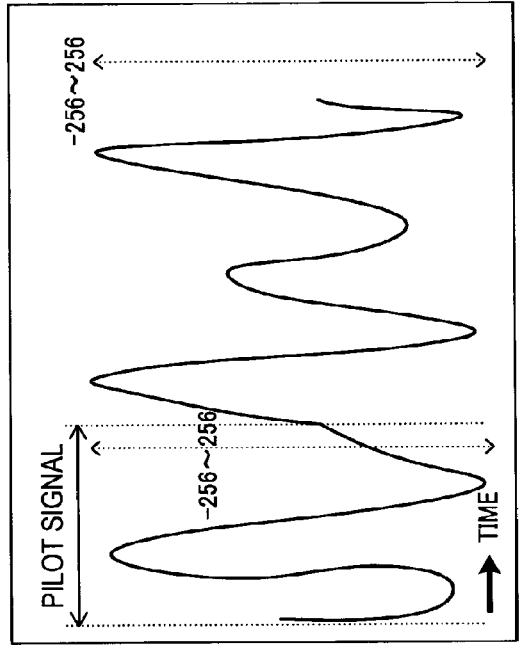
FIG.13B
FIG.13C
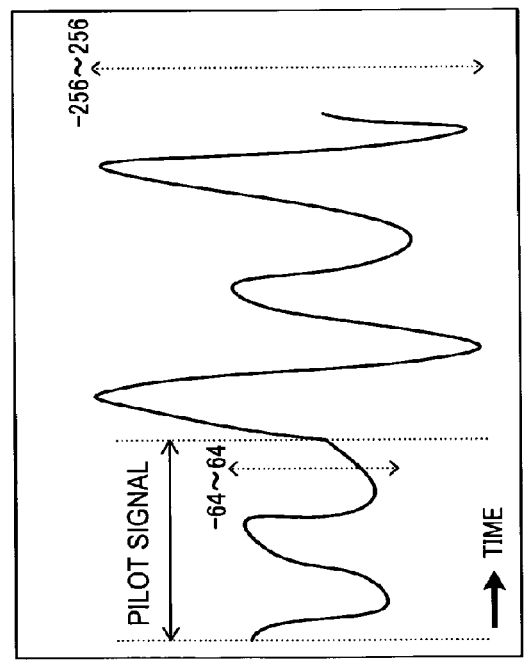
FIG.13D

SWITCHING OF NUMBER OF
TRANSMITTING ANTENNAS

| | TWO TRANSMITTING ANTENNAS | FOUR TRANSMITTING ANTENNAS | | |
|---|---|---|---|---|
| TRANSMITTING ANTENNA T1 | 1.00W | 0.5W | 0.75W | 1.00W |
| TRANSMITTING ANTENNA T2 | 1.00W | 0.5W | 0.75W | 1.00W |
| TRANSMITTING ANTENNA T3 | | 0.5W | 0.75W | 1.00W |
| TRANSMITTING ANTENNA T4 | | 0.5W | 0.75W | 1.00W |

→ TIME

FIG.25

SWITCHING OF NUMBER OF
TRANSMITTING ANTENNAS

| | FOUR TRANSMITTING ANTENNAS | TWO TRANSMITTING ANTENNAS | | |
|---|---|---|---|---|
| TRANSMITTING ANTENNA T1 | 0.5W | 1.0W | 0.75W | 0.5W |
| TRANSMITTING ANTENNA T2 | 0.5W | 1.0W | 0.75W | 0.5W |
| TRANSMITTING ANTENNA T3 | 0.5W | | | |
| TRANSMITTING ANTENNA T4 | 0.5W | | | |

→ TIME

FIG.26

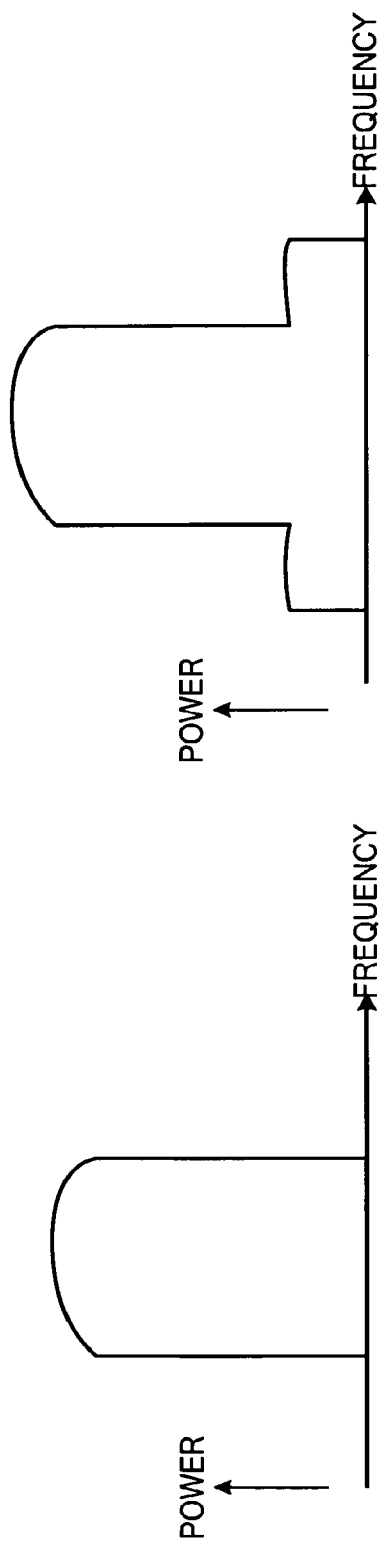

2701: SIGNAL DETECTION SYMBOL
2702: GAIN CONTROL SYMBOL
2703: FREQUENCY OFFSET ESTIMATION SYMBOL
2704: TRANSMISSION METHOD INFORMATION SYMBOL
2705: RADIO WAVE PROPAGATION ENVIRONMENT ESTIMATION SYMBOL
2706: DATA SYMBOL

PILOT SYMBOLS

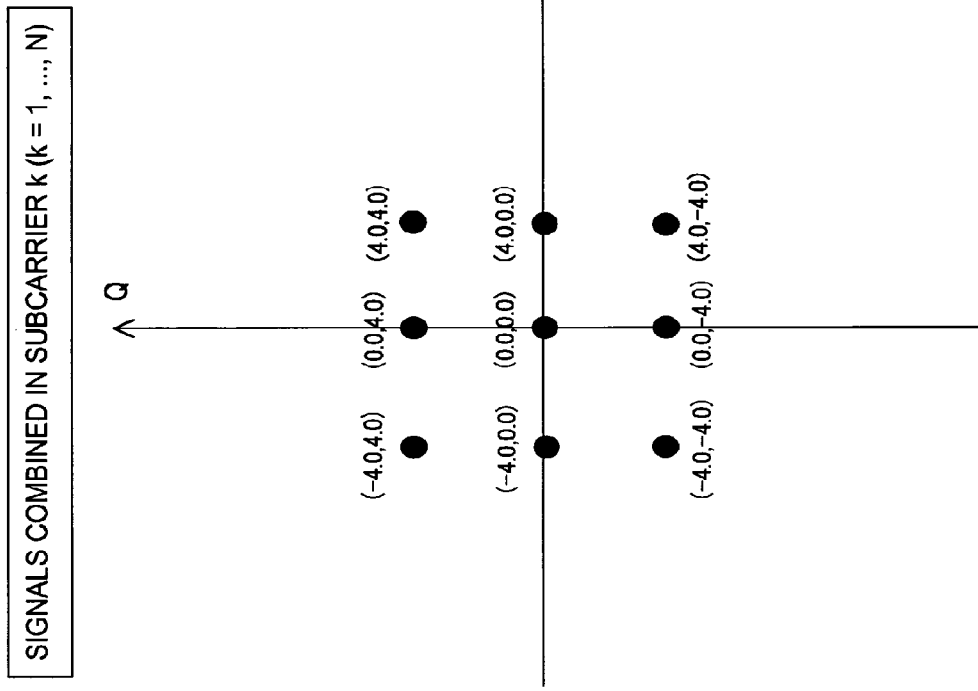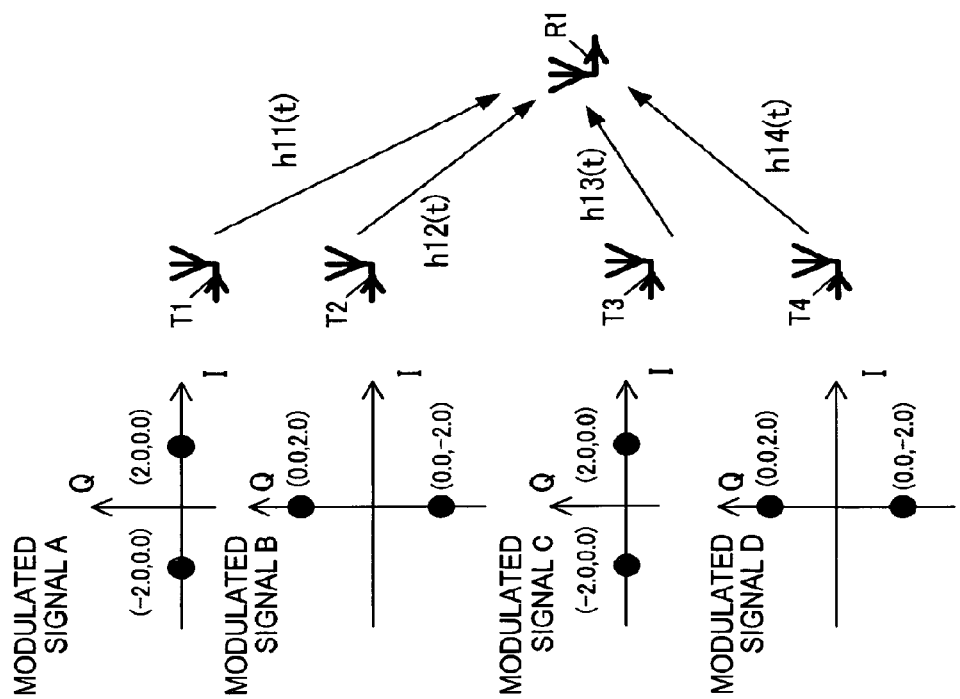
FIG.35

RECEPTION METHOD AND RECEPTION APPARATUS

This is a continuation application of application Ser. No. 13/564,465 filed Aug. 1, 2012, which is a continuation application of application Ser. No. 13/023,380 filed Feb. 8, 2011, now U.S. Pat. No. 8,260,228 issued Sep. 4, 2012, which is a continuation application of application Ser. No. 11/937,422 filed Nov. 8, 2007, now U.S. Pat. No. 7,917,102 issued Mar. 29, 2011, which is a continuation application of application Ser. No. 10/566,682 filed Mar. 14, 2006, now U.S. Pat. No. 7,324,481 issued Jan. 29, 2008, which is a national stage of PCT/JP2004/011505 filed Aug. 4, 2004, which is based on Japanese Application No. 2003-289060 filed Aug. 7, 2003 and JP 2004-071322 filed Mar. 12, 2004, the entire contents of each of which are incorporated by reference herein.

TECHNICAL FIELD

The present invention relates in particular to a radio transmitting apparatus and radio transmission method whereby modulated signals are transmitted using a plurality of antennas.

BACKGROUND ART

Heretofore, methods have been proposed whereby the amount of transmitted information is increased by transmitting different modulated signals from a plurality of antennas, and separating and modulating modulated signals transmitted simultaneously from individual antennas on the receiving side, as with the transmission method known as MIMO (Multi Input Multi Output) described in "Proposal for an SDM-COFDM System for Wideband Mobile Communications Achieving 100 Mbit/s by Means of MIMO Channels" (IEICE Technical Report RCS-2001-135, October 2001), for example.

This method will be explained briefly. A case will be considered in which, as shown in FIG. 1, a modulated signal A and modulated signal B are simultaneously transmitted from two antennas T1 and T2 respectively, and modulated signals A and B are received by two antennas R1 and R2. In this case, it is necessary for four channel fluctuations $h11(t)$, $h12(t)$, $h21(t)$, and $h22(t)$ to be estimated on the receiving side.

Therefore, pilot symbols (radio wave propagation environment estimation symbols) 01, 02, 03, and 04 for estimating channel fluctuations $h11(t)$, $h12(t)$, $h21(t)$, and $h22(t)$ are placed in modulated signals A and B as shown in FIG. 2. Here, a C known signal is sent with pilot symbols 01 and 03, a -C* known signal with pilot symbol 02, and a C* known signal with pilot symbol 04. An asterisk (*) indicates a conjugate complex number. Apart from pilot symbols 01, 02, 03, and 04, data symbols are also placed in both modulated signal A and modulated signal B.

With a conventional radio transmitting apparatus that simultaneously transmits different modulated signals from a plurality of antennas in this way, embedding pilot symbols in the modulated signals transmitted from the antennas enables modulated signals multiplexed together on the propagation path to be satisfactorily separated and demodulated on the receiving side.

Heretofore, also, a system has been proposed whereby, taking the above-described technology as a basis, the number of antennas that transmit modulated signals is changed according to the radio wave propagation environment and so forth. With this system, when four antennas are provided on the transmitting side, for example, four different modulated signals are simultaneously transmitted using all four antennas when the radio wave propagation environment is good, whereas two different modulated signals are simultaneously transmitted using only two antennas when the radio wave propagation environment is poor.

However, with a system in which the number of modulated signals transmitted simultaneously is changed according to the radio wave propagation environment and so forth, the received signal level also changes in accordance with a change of the number of transmitting antennas (that is, the number of transmit modulated signals), and therefore the quantization error of an analog/digital converter in the receiving apparatus may become large. As this quantization error greatly affects the channel estimation precision and information data error rate, the modulated signal reception quality falls.

DISCLOSURE OF INVENTION

It is an object of the present invention to provide a radio transmitting apparatus and radio transmission method that enable reception quality to be improved by reducing pilot symbol and data symbol quantization error in a system in which the number of simultaneously transmitted modulated signals is changed according to the propagation environment and so forth.

This object is achieved by changing the transmit power of the modulated signal transmitted from each antenna according to the number of antennas that simultaneously transmit modulated signals (that is, the number of modulated signals).

BRIEF DESCRIPTION OF DRAWINGS

FIG. 1 is a drawing provided to explain a case in which modulated signals are transmitted from two antennas;

FIG. 2 is a drawing showing pilot symbols placed in modulated signals;

FIG. 7A is a table showing a sample symbol signal point arrangement of modulated signal A;

FIG. 7B is a table showing a sample symbol signal point arrangement of modulated signal B transmitted at the same time as modulated signal A;

FIG. 11A is a table showing a sample symbol signal point arrangement of modulated signal A;

FIG. 11B is a table showing a sample symbol signal point arrangement of modulated signal B;

FIG. 11C is a table showing a sample symbol signal point arrangement of modulated signal C;

FIG. 11D is a table showing a sample symbol signal point arrangement of modulated signal D;

FIG. 13A is a waveform diagram of data symbols of four modulated signals;

FIG. 13B is a composite waveform diagram of four data symbols;

FIG. 13C is a drawing showing the relationship between the waveform of a general pilot symbol and the composite waveform of four data symbols;

FIG. 13D is a drawing showing the relationship between the waveform of a pilot symbol of an embodiment and the composite waveform of four data symbols;

FIG. 25 is a drawing showing restoration to its original level of transmit power lowered due to an increase in the number of transmitting antennas;

FIG. 26 is a drawing showing restoration to its original level of transmit power raised due to a decrease in the number of transmitting antennas;

FIG. 27A is a drawing showing a frequency spectrum in which distortion is not generated;

FIG. 27B is a drawing showing a frequency spectrum in which distortion is generated;

FIG. 35 is a drawing showing signal point arrangements of modulated signals A through D, and a sample signal point arrangement of a composite signal of modulated signals A through D, when modulated signals A, B, C, and D are transmitted using different signal point arrangements;

BEST MODE FOR CARRYING OUT THE INVENTION

The gist of the present invention is that, in a radio transmitting apparatus in which the number of modulated signals transmitted simultaneously can be changed, the transmit power of the modulated signal transmitted from each antenna is changed according to the number of antennas that simultaneously transmit modulated signals (that is, the number of modulated signals). That is to say, as shown in the basic configuration diagram in FIG. 3, radio transmitting apparatus 10 has a plurality of antennas T1 through Tn, modulated signal number setting section 11 that sets the number of modulated signals (modulated signal 1 through modulated signal n) transmitted using plurality of antennas T1 through Tn, and transmit power changing section 12 that changes the transmit power of the modulated signals (modulated signal 1 through modulated signal n) according to the number of transmit modulated signals.

With reference now to the accompanying drawings, embodiments of the present invention will be explained in detail below.

Embodiment 1

A particular feature of this embodiment is that the transmit power of a pilot symbol contained in a modulated signal is changed according to the number of antennas that simultaneously transmit modulated signals (that is, the number of modulated signals). By this means, pilot symbol quantization error in a receiving apparatus can be reduced.

Specifically, when the number of simultaneously transmitted modulated signals is changed, the combined power (that is, the dynamic range) of data symbols contained in each modulated signal changes on the receiving side, and therefore pilot symbol transmit power is changed so as to match this combined data symbol dynamic range. Actually, the signal point arrangement when a pilot symbol is formed is changed so that the ratio of data symbol transmit power to pilot symbol transmit power changes according to the number of transmit modulated signals.

(1) Principle

First, the principle of this embodiment will be explained.

Figure 4:
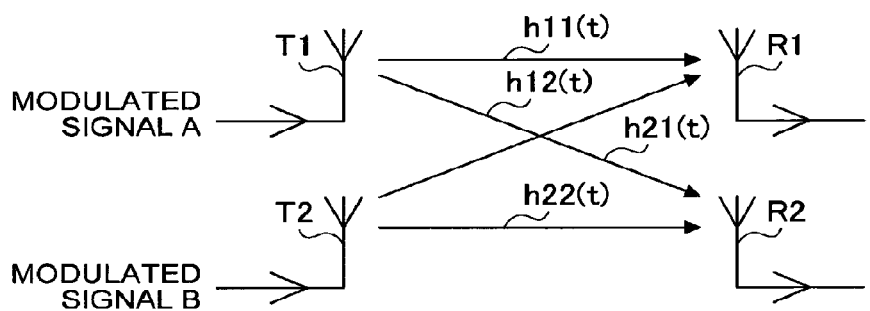
FIG. 4 is a drawing provided to explain a case in which modulated signals are transmitted from two antennas.

A case will be described in which, as shown in FIG. 4, a modulated signal A and modulated signal B are simultaneously transmitted from two antennas T1 and T2 respectively, signals in which modulated signals A and B are combined are received by two antennas R1 and R2, and these signals are separated and demodulated.

In this case, it is necessary on the receiving side to estimate four channel fluctuations $h11(t)$, $h12(t)$, $h21(t)$, and $h22(t)$ [where t indicates time], and demodulate the modulated signals. It is therefore necessary for pilot symbols such as symbols for signal detection, control symbols for frequency offset estimation and time synchronization, transmission method information symbols, and radio wave propagation environment estimation symbols, to be provided in modulated signals A and B.

Although symbols necessary for demodulation such as symbols for signal detection, control symbols, and radio wave propagation environment symbols, can be collectively called pilot symbols, unique words, preambles, and so forth, in this embodiment they are all referred to as pilot symbols. Estimation of channel fluctuations $h11(t)$, $h12(t)$, $h21(t)$, and $h22(t)$ is performed using radio wave propagation environment symbols.

Figure 5A:
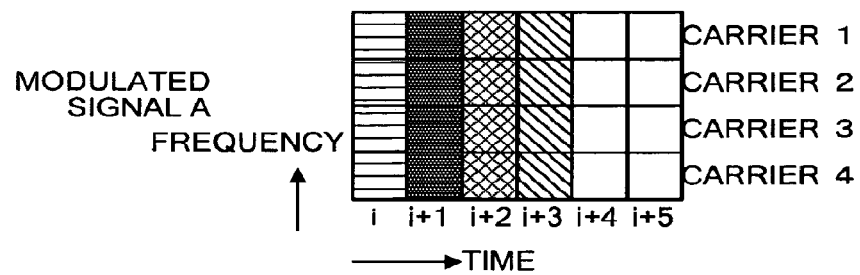
FIG. 5A is a drawing showing a sample frame configuration of modulated signal A.
Figure 5B:
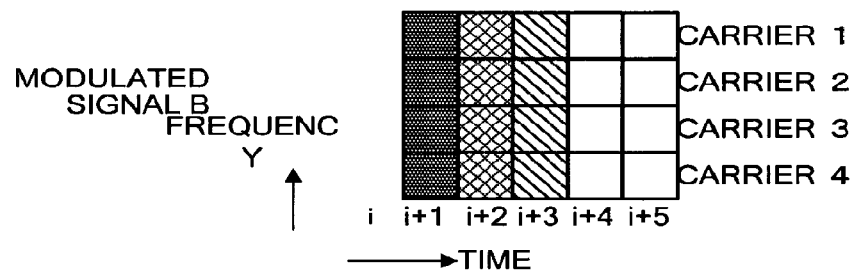
FIG. 5B is a drawing showing a sample frame configuration of modulated signal B transmitted at the same time as modulated signal A.

FIG. 5A and FIG. 5B are drawings showing sample frame configurations of modulated signal A and modulated signal B. As an example, FIG. 5A and FIG. 5B show frame configurations on time-frequency axes when modulated signals A and B are OFDM (Orthogonal Frequency Division Multiplexing) signals. In FIG. 5A and FIG. 5B, reference code 101 denotes a symbol for signal detection, reference code 102 denotes a control symbol for frequency offset estimation and time synchronization, reference code 103 denotes a transmission method information symbol, reference code 104 denotes a radio wave propagation environment estimation symbol, and reference code 105 denotes a data symbol.

Figure 6:
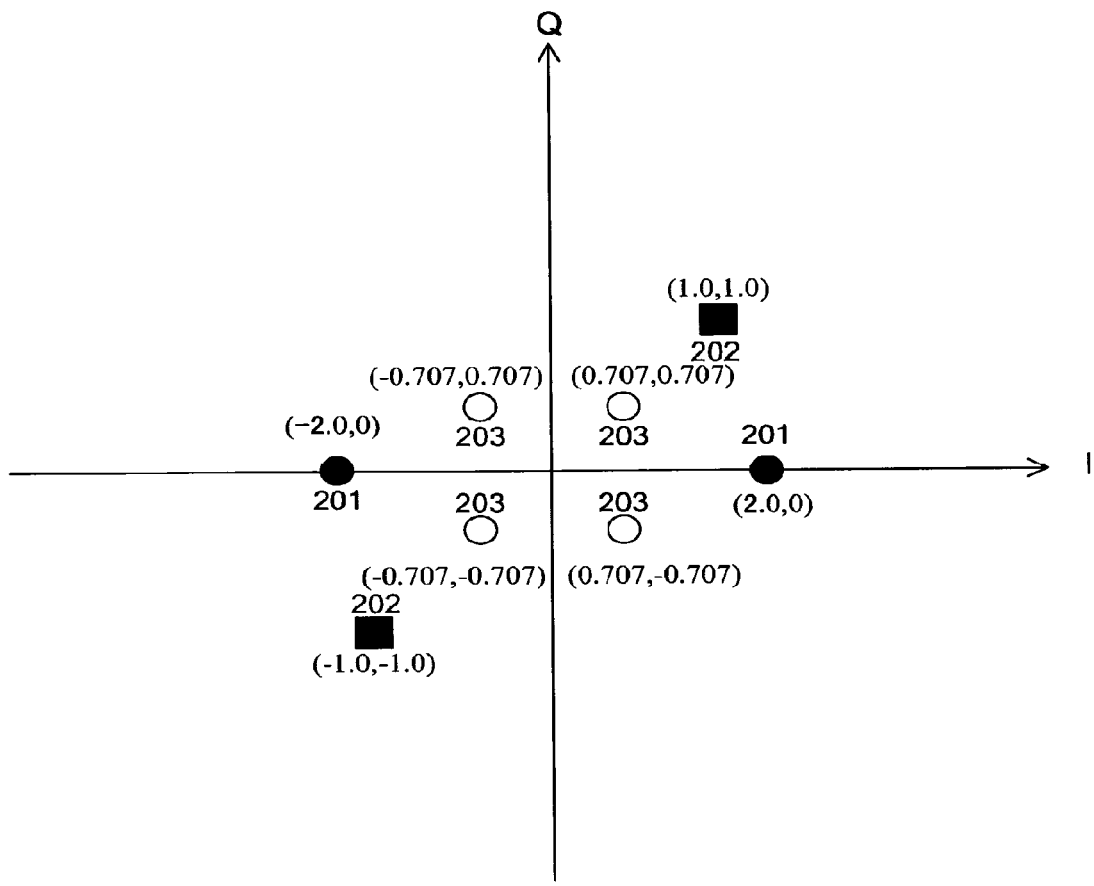
FIG. 6 is a drawing showing a sample signal point arrangement of each symbol when two modulated signals are transmitted simultaneously.

FIG. 6 shows sample signal point arrangements in the in-phase I-quadrature Q plane of the symbols in FIG. 5A and FIG. 5B. Reference code 201 indicates a signal point of a signal detection symbol 101, with (I,Q)=(2.0,0) or (−2.0,0). Reference code 202 indicates a signal point of a control symbol 102 or radio wave propagation environment estimation symbol 104, with (I,Q)=(1.0,1.0) or (−1.0,−1.0). Reference code 203 indicates a signal point in the case of a QPSK (Quadrature Phase Shift Keying) data symbol, with (I,Q)=(0.707,0.707), (0.707,−0.707), (−0.707,0.707), or (−0.707,−0.707).

FIG. 7A and FIG. 7B are tables showing symbol signal point arrangements in the I-Q plane of modulated signal A and modulated signal B with the frame configurations in FIG. 5A and FIG. 5B. Here, the reason why different sequences are used in modulated signal A and modulated signal B at time i+1 in FIG. 7A and FIG. 7B (equivalent to control symbol 102 in FIG. 5A and FIG. 5B) is explained. If the same sequence were used by each transmitting antenna, the PAPR (Peak-to-Average Power Ratio) when in-phase combining is performed on the receiving side would be large, and the dynamic range of a signal input to the receiving apparatus would be unstable. Different sequences are therefore used in order to keep the PAPR small. The method of creating different sequences here is not limited to the method shown in FIG. 7A and FIG. 7B, the essential point being that the PAPR should be made small. Different sequences are also used for time i+3 (equivalent to radio wave propagation environment estimation symbol 104 in FIG. 5A and FIG. 5B) for the same reason.

Figure 8:
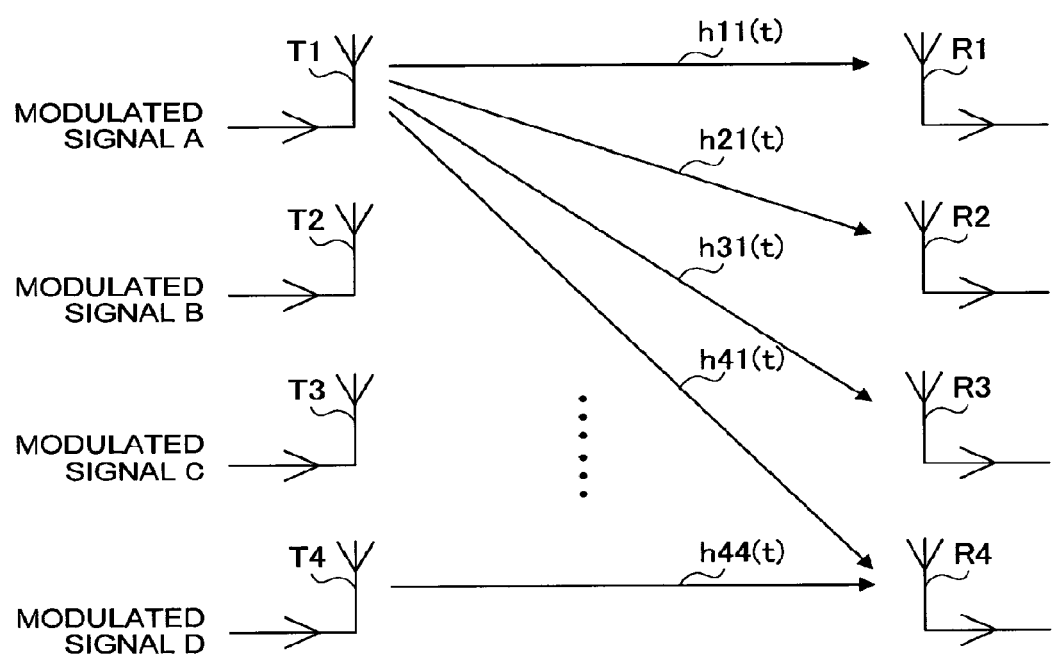
FIG. 8 is a drawing provided to explain a case in which modulated signals are transmitted from four antennas.
Figure 9A:
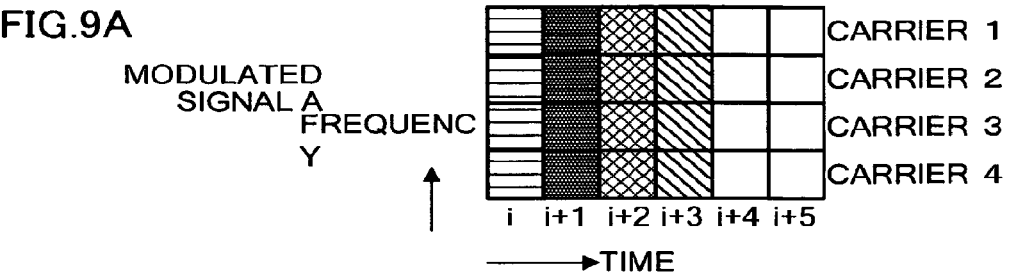
FIG. 9A is a drawing showing a sample frame configuration of modulated signal A.
Figure 9B:
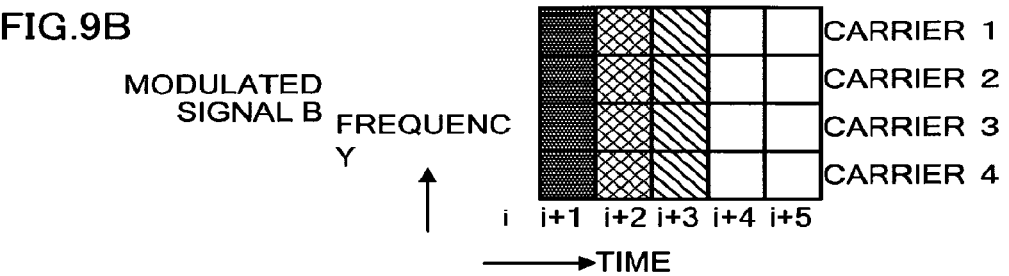
FIG. 9B is a drawing showing a sample frame configuration of modulated signal B.
Figure 9C:
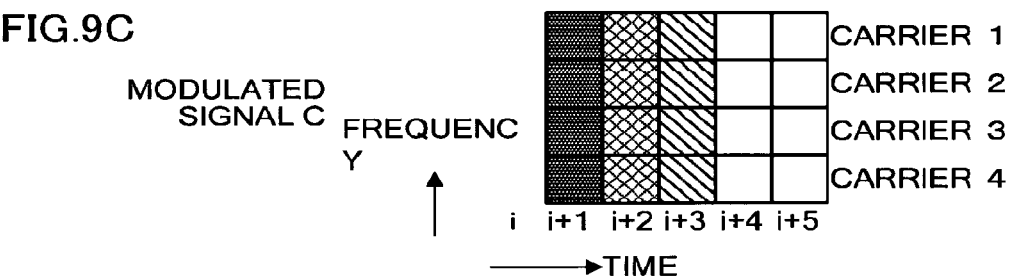
FIG. 9C is a drawing showing a sample frame configuration of modulated signal C.
Figure 9D:
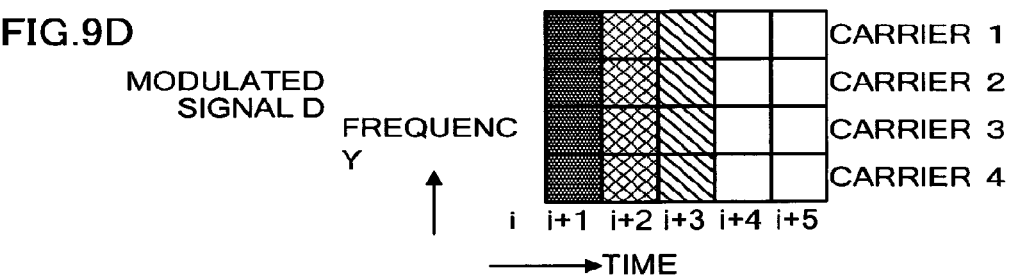
FIG. 9D is a drawing showing a sample frame configuration of modulated signal D.

A case will now be described in which, as shown in FIG. 8, modulated signals A, B, C, and D are simultaneously transmitted from four antennas T1, T2, T3, and T4 respectively, signals in which modulated signals A, B, C, and D are combined are received by four antennas R1, R2, R3, and R4, and these signals are separated and demodulated.

In this case, it is necessary for 4×4=16 channel fluctuations $h11(t)$, $h21(t)$, $h31(t)$, $h41(t)$, ..., $h44(t)$ to be estimated and demodulated on the receiving side. It is therefore necessary, as in the case of two antennas described above, for pilot symbols such as symbols for signal detection, control symbols for frequency offset estimation and time synchronization, transmission method information symbols, and radio wave propagation environment estimation symbols, to be provided in modulated signals A, B, C, and D.

FIG. 9A through FIG. 9D, in which parts corresponding to those in FIG. 5A and FIG. 5B are assigned the same codes as in FIG. 5A and FIG. 5B, show frame configurations of modulated signal A, modulated signal B, modulated signal C, and modulated signal D.

Figure 10:
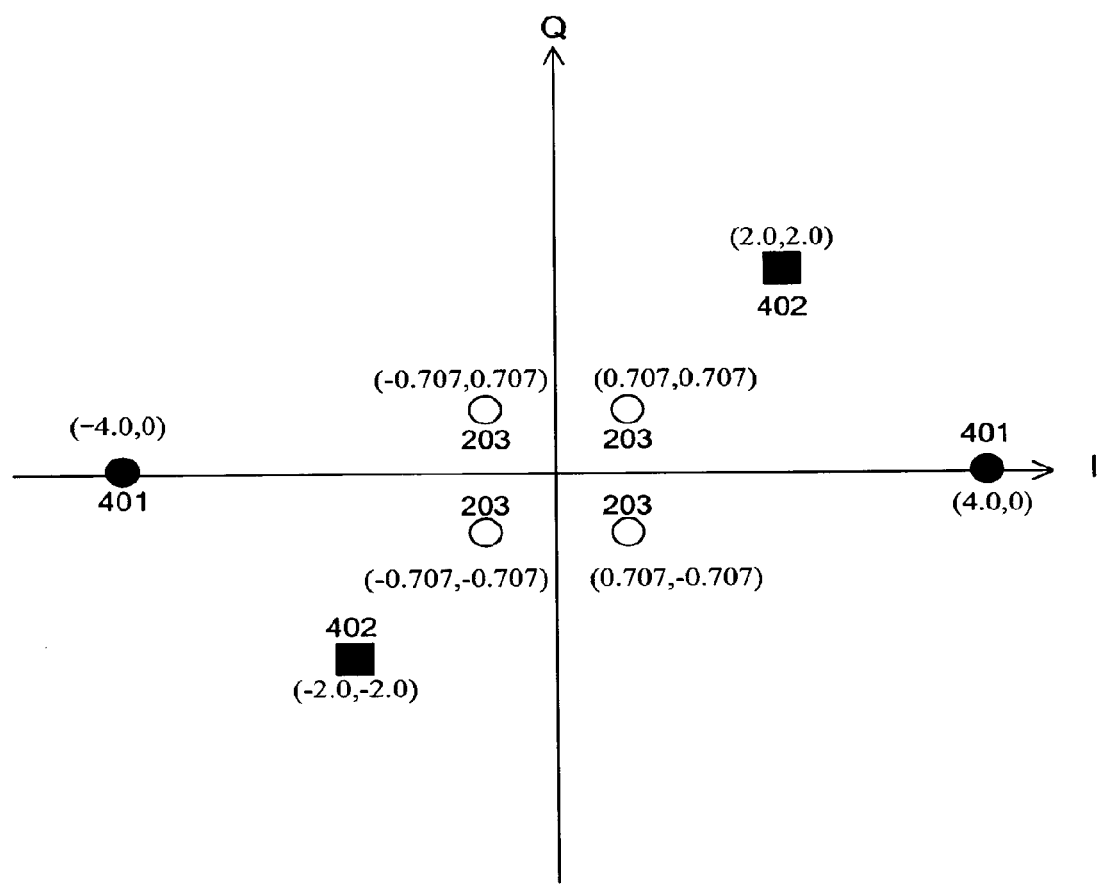
FIG. 10 is a drawing showing a sample signal point arrangement of each symbol when four modulated signals are transmitted simultaneously.

FIG. 10 shows signal point arrangements in the in-phase I-quadrature Q plane of the symbols in FIG. 9A through FIG. 9D. Reference code 401 indicates a signal point of signal detection symbol 101, with (I,Q)=(4.0,0) or (−4.0,0). Reference code 402 indicates a signal point of control symbol 102 or radio wave propagation environment estimation symbol 104, with (I,Q)=(2.0,2.0) or (−2.0,−2.0). Reference code 203 indicates a signal point in the case of a QPSK data symbol, with (I,Q)=(0.707,0.707), (0.707,−0.707), (−0.707,0.707), or (−0.707,−0.707).

FIG. 11A through FIG. 11D are tables showing sample signal point arrangements in the I-Q plane of modulated signal A, modulated signal B, modulated signal C, and modulated signal D with the frame configurations in FIG. 9A through FIG. 9D. Here, the reason why different sequences are used in FIG. 11A and FIG. 11B at time i+1 in FIG. 11A through FIG. 11D (equivalent to control symbol 102 in FIG. 9A through FIG. 9D) is explained. If the same sequence were used by each transmitting antenna, the PAPR when in-phase combining is performed on the receiving side would be large, and the dynamic range of a signal input to the receiving apparatus would be unstable. Different sequences are therefore used in order to keep the PAPR small. The method of creating different sequences here is not limited to the method shown in FIG. 11A through FIG. 11D, the essential point being that the PAPR should be made small. Different sequences are also used for time i+3 (equivalent to radio wave propagation environment estimation symbol 104 in FIG. 9A through FIG. 9D) for the same reason.

Figure 12A:
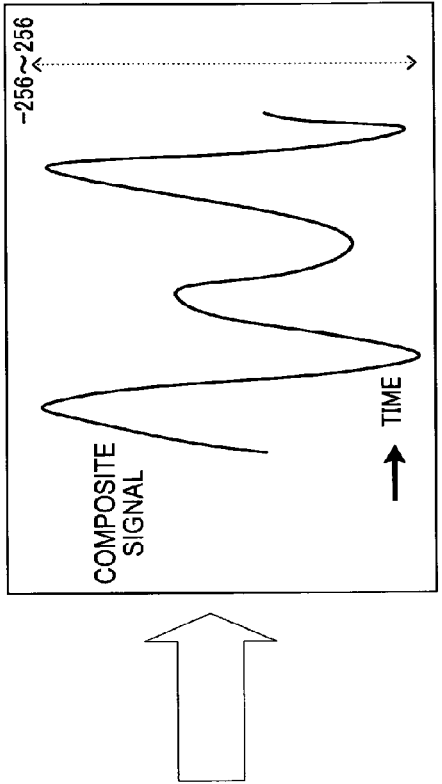
FIG. 12A is a waveform diagram of data symbols of two modulated signals.
Figure 12C:
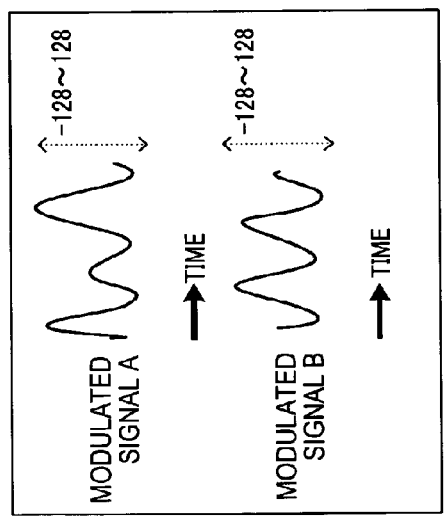
FIG. 12C is a drawing showing the relationship between the waveform of a general pilot symbol and the composite waveform of two data symbols.
Figure 12B:
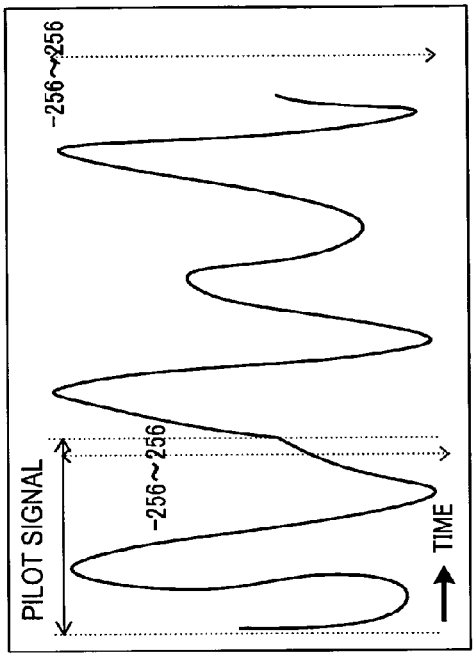
FIG. 12B is a composite waveform diagram of two data symbols.
Figure 12D:
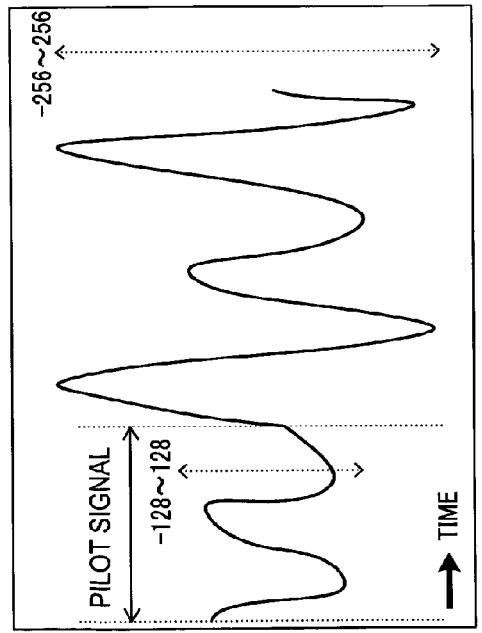
FIG. 12D is a drawing showing the relationship between the waveform of a pilot symbol of an embodiment and the composite waveform of two data symbols.

FIG. 12A through FIG. 12D show examples of waveforms of modulated signals on the time axis when modulated signals A and B are transmitted from two antennas T1 and T2 as shown in FIG. 4 through FIG. 7. FIG. 12A shows the waveforms of data symbols of modulated signals A and B. FIG. 12B shows the waveform of a composite signal of modulated signal A and modulated signal B. FIG. 12C and FIG. 12D show waveforms when a pilot symbol modulated signal is inserted in the composite signal in FIG. 12B.

FIG. 13A through FIG. 13D show examples of waveforms of modulated signals on the time axis when modulated signals A through D are transmitted from four antennas T1 through T4 as shown in FIG. 8 through FIG. 11. FIG. 13A shows the waveforms of data symbols of modulated signals A through D. FIG. 13B shows the waveform of a composite signal of modulated signals A, B, C, and D. FIG. 13C and FIG. 13D show waveforms when a pilot symbol modulated signal is inserted in the composite signal in FIG. 13B.

The characteristics and effects of a radio transmitting apparatus of this embodiment will now be explained.

The first characteristic is that, as is clear from FIG. 6 and FIG. 10, the maximum signal point amplitude (the amplitude at which the distance between a signal point and the origin is greatest) of each pilot symbol is made larger than the maximum signal point amplitude of a data symbol modulated signal. This enables a pilot symbol, which is extremely important in data demodulation, to be detected with good precision. In addition, this enables the pilot symbol reception level in a receiving apparatus to be brought close to the data symbol reception level. That is to say, generally, data symbols are mostly transmitted simultaneously from all antennas in order to increase the amount of data transmitted, whereas pilot symbols, for which the emphasis is on detection precision, are usually transmitted from one antenna at a time, switching among the transmitting antennas, for example. Taking this into consideration, making the maximum signal point amplitude of pilot symbols larger than the maximum signal point amplitude of data symbols, as in this embodiment, brings the reception levels of data symbols and pilot symbols closer, and enables quantization error in the receiving apparatus to be reduced.

The second characteristic is that the maximum signal point amplitude at time i when only modulated signal A is transmitted (in this embodiment, only signal detection symbol 101 is transmitted) is made larger than the maximum signal point amplitude of a pilot symbol at other times. This enables the reception level of only a pilot symbol of modulated signal A to be made equal to the pilot symbol reception level when modulated signal A and modulated signal B are multiplexed. That is to say, in this embodiment, the maximum signal point amplitude of pilot symbols is made larger the lower the degree of pilot symbol multiplexing. By this means pilot symbol reception levels can be made approximately the same, enabling quantization error in the receiving apparatus to be reduced. In other words, while the above-described first characteristic reduces quantization error by making the reception levels of data symbols and pilot symbols equal, this second characteristic reduces quantization error by making pilot symbol reception levels equal.

The third characteristic is that the maximum signal point amplitude of pilot symbols when four modulated signals A through D are transmitted using four transmitting antennas T1 through T4 is made larger than the maximum signal point amplitude of pilot symbols when two modulated signals A and B are transmitted using two transmitting antennas T1 and T2. By this means the reception levels of data symbols and pilot symbols can be brought closer, enabling quantization error in the receiving apparatus to be reduced.

For example, as shown in FIG. 6 and FIG. 10, the maximum signal point amplitude of signal detection symbols 101 (FIG. 5A, FIG. 5B, FIG. 9A through FIG. 9D) is 2 when the number of transmitting antennas is two and two modulated signals are transmitted (signal points 201 in FIG. 6), but 4 when the number of transmitting antennas is four and four modulated signals are transmitted (signal points 401 in FIG. 10). Similarly, the signal point amplitude of control symbols for frequency offset estimation and time synchronization 102 and radio wave propagation environment estimation symbols 104 is 1.414 when the number of transmitting antennas is two and two modulated signals are transmitted (signal points 202 in FIG. 6), but 2.828 when the number of transmitting antennas is four and four modulated signals are transmitted (signal points 402 in FIG. 10).

Here, the combined number of data symbols is two when modulated signals are transmitted from two antennas, and four when modulated signals are transmitted from four antennas. In contrast, if the fact that pilot symbols are not transmitted from all antennas, as stated above, is considered (if it is assumed that pilot symbols are transmitted from only one antenna, for example), in order to make the data symbol reception level and pilot symbol reception level equal, it is necessary to increase the pilot symbol transmit power the greater the number of antennas used. Considering this point, in this embodiment data symbol and pilot symbol reception levels are coordinated, and quantization error is reduced, by increasing the pilot symbol transmit power the greater the number of antennas used (that is, the greater the number of modulated signals transmitted).

Next, the actions and effects of the above-described characteristics of this embodiment will be described.

First, a case in which two modulated signals are transmitted by two transmitting antennas will be considered. The operating range of modulated signal A and B data symbols will be assumed to be, for example, −128 to 128, as shown in FIG. 12A. The waveform of a composite signal combining two modulated signal A and B data symbols (a composite signal of modulated signal A and modulated signal B being received by the receiving antennas) then has an operating range −256 to 256, as shown in FIG. 12B. These values are not exact, but the operating range is larger than −128 to 128.

FIG. 12C and FIG. 12D show modulated signals when a signal detection symbol 101, control symbol for frequency offset estimation and time synchronization 102, transmission method information symbol 103, radio wave propagation environment estimation symbol 104, or suchlike pilot symbol modulated signal (pilot signal) is added to the data symbol composite signal in FIG. 12B. If the operating range of the pilot signal is −128 to 128 while the operating range of the data symbol composite signal is −256 to 256, as in FIG. 12C, quantization error in the analog/digital conversion section of the receiving apparatus increases, and therefore the precision of separation of modulated signal A data symbols and modulated signal B data symbols falls, as does the precision of demodulation of modulated signal A data symbols and modulated signal B data symbols.

Considering this point, in this embodiment, by performing operations as outlined in the description of characteristics above, the pilot symbol transmit power (maximum signal point amplitude) is selected as appropriate according to the number of modulated signals and so forth so that the operating range of a data symbol composite signal and the operating range of a pilot signal come to be of the same level, as in FIG. 12D. For example, when the data symbol composite signal operating range is −256 to 256, it is only necessary to have the pilot signal operating range also become −256 to 256 in line with this, as shown in FIG. 12D.

Next, a case in which four modulated signals are transmitted by four transmitting antennas will be considered. The operating range of modulated signal A through D data symbols will be assumed to be, for example, −64 to 64, as shown in FIG. 13A. The waveform of a composite signal combining four modulated signal A through D data symbols (a composite signal of modulated signals A through D being received by the receiving antennas) then has an operating range −256 to 256, as shown in FIG. 13B. These values are not exact, but the operating range is larger than −64 to 64. Also, the ratio of the composite signal operating range to the operating range of each modulated signal is larger compared to when two modulated signals are transmitted by two transmitting antennas. It is here assumed that the ratio of the composite signal operating range to the operating range of each modulated signal is 2 when two modulated signals are transmitted by two transmitting antennas, and the ratio of the composite signal operating range to the operating range of each modulated signal is 4 when four modulated signals are transmitted by four transmitting antennas. In this embodiment, considering this difference in operating range ratios, the operation described under the third characteristic above is performed.

FIG. 13C and FIG. 13D show modulated signals when signal detection symbol 101, control symbol for frequency offset estimation and time synchronization 102, transmission method information symbol 103, radio wave propagation environment estimation symbol 104, or suchlike pilot symbol modulated signal (pilot signal) is added to the data symbol composite signal in FIG. 13B. If the operating range of the pilot signal is −64 to 64 while the operating range of the data symbol composite signal is −256 to 256, as in FIG. 13C, quantization error in the analog/digital conversion section of the receiving apparatus increases, and therefore the precision of separation of modulated signal A through D data symbols falls, as does the precision of demodulation of modulated signal A through D data symbols.

Considering this point, in this embodiment, by performing operations as outlined in the description of characteristics above, the pilot symbol transmit power (maximum signal point amplitude) is selected as appropriate according to the number of modulated signals and so forth so that the operating range of a data symbol composite signal and the operating range of a pilot signal come to be of the same level, as in FIG. 13D. For example, when the data symbol composite signal operating range is −256 to 256, it is only necessary to have the pilot signal operating range also become −256 to 256 in line with this, as shown in FIG. 13D.

That is to say, in this embodiment, performing operations as outlined in the description of the first through third characteristics above enables a waveform as shown in FIG. 12D and FIG. 13D to be obtained, thereby enabling quantization error in the analog/digital conversion section of the receiving apparatus to be reduced. As a result, the precision of separation of modulated signals A and B or modulated signals A through D is improved, and the reception quality of the modulated signals is also improved.

Thus, according to this embodiment, the reception quality of data in a receiving apparatus is improved by changing the pilot signal point arrangement in accordance with a change in the number of modulated signals transmitted. At this time, the effect is further heightened by making the signal point amplitude of pilot symbols larger the greater the number of modulated signals transmitted.

Here, a description has been given taking signal detection symbol 101 as an example of a pilot symbol present only in modulated signal A (that is, a non-multiplexed pilot symbol), but, naturally, control symbol 102 or radio wave propagation environment estimation symbol 104 may also be taken as a non-multiplexed pilot symbol. That is to say, the multiplexing method is not limited to the cases shown in FIG. 5A, FIG. 5B, and FIG. 9A through FIG. 9D, and the present invention is widely effective in cases where the degree of multiplexing of pilot symbols is small compared with data symbols. A specific example of this will be described in detail in Embodiment 3.

(2) Configuration

Figure 14:
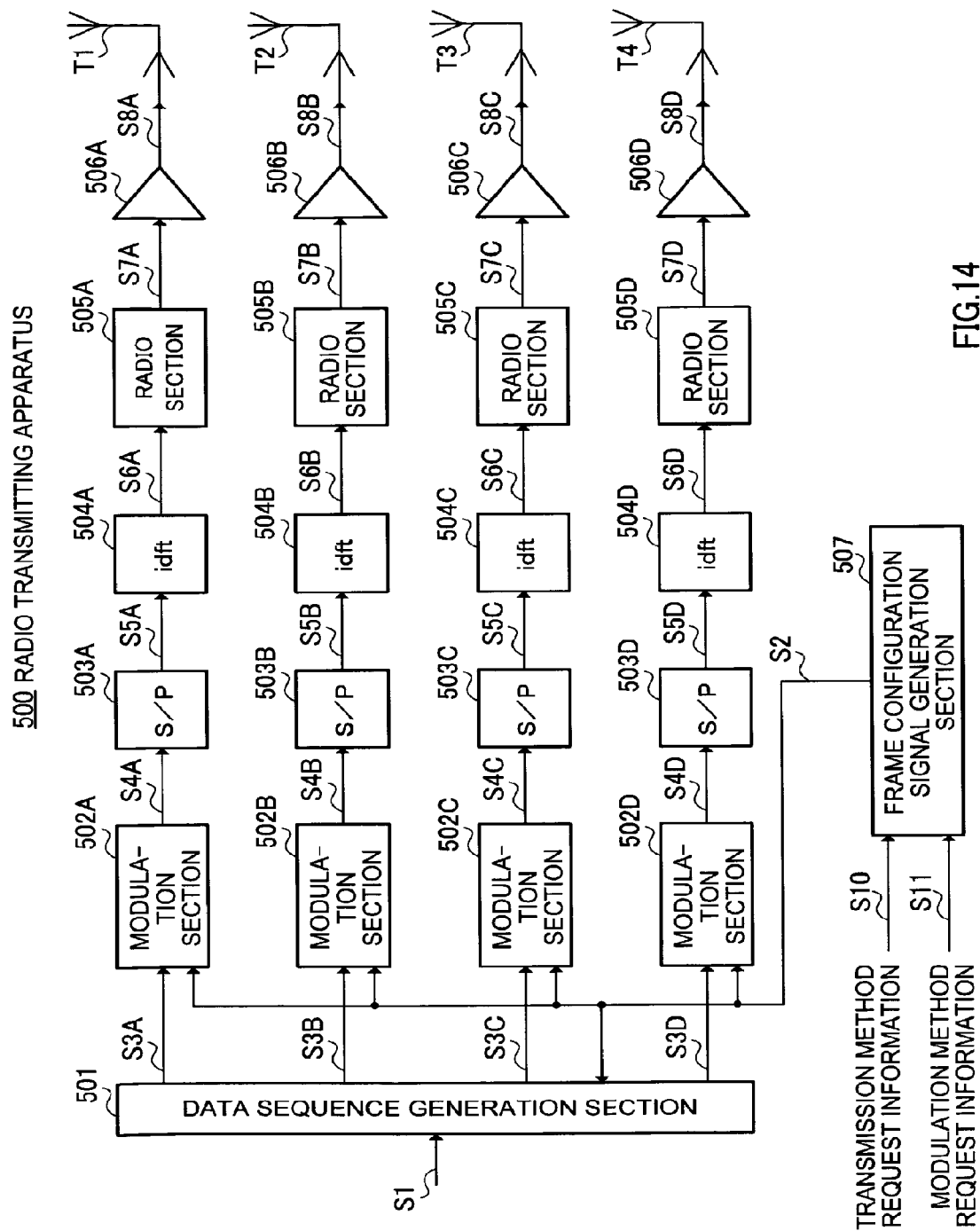
FIG. 14 is a drawing showing the configuration of a radio transmitting apparatus of Embodiment 1.

FIG. 14 shows the configuration of a radio transmitting apparatus 500 according to this embodiment.

A data sequence generation section 501 has a transmit digital signal S1 and a frame configuration signal S2 as input, and based on frame configuration signal S2, outputs a modulated signal A transmit digital signal S3A, modulated signal B transmit digital signal S3B, modulated signal C transmit digital signal S3C, and modulated signal D transmit digital signal S3D.

Modulation sections 502A through 502D have modulated signal A through D transmit digital signals S3A through S3D respectively, and frame configuration signal S2, as input, and output transmit baseband signals S4A through S4D in accordance with frame configuration signal S2.

Serial/parallel conversion sections 503A through 503D have transmit baseband signals S4A through S4D respectively as input, and output parallel signals S5A through S5D. Inverse Fourier transform sections (idft) 504A through 504D have parallel signals S5A through S5D respectively as input, and output post-inverse-Fourier-transform parallel signals S6A through S6D. Radio sections 505A through 505D have post-inverse-Fourier-transform parallel signals S6A through S6D respectively as input, and output transmit signals S7A through S7D.

Power amplification sections 506A through 506D have transmit signals S7A through S7D respectively as input, and output amplified transmit signals S8A through S8D. These amplified transmit signals S8A through S8D are output as radio waves from antennas T1 through T4 respectively.

A frame configuration signal generation section 507 has transmission method request information S10 and modulation method request information S11 as input, determines the transmission method and modulation method, and outputs frame configuration related information containing that information as frame configuration signal S2.

Figure 15:
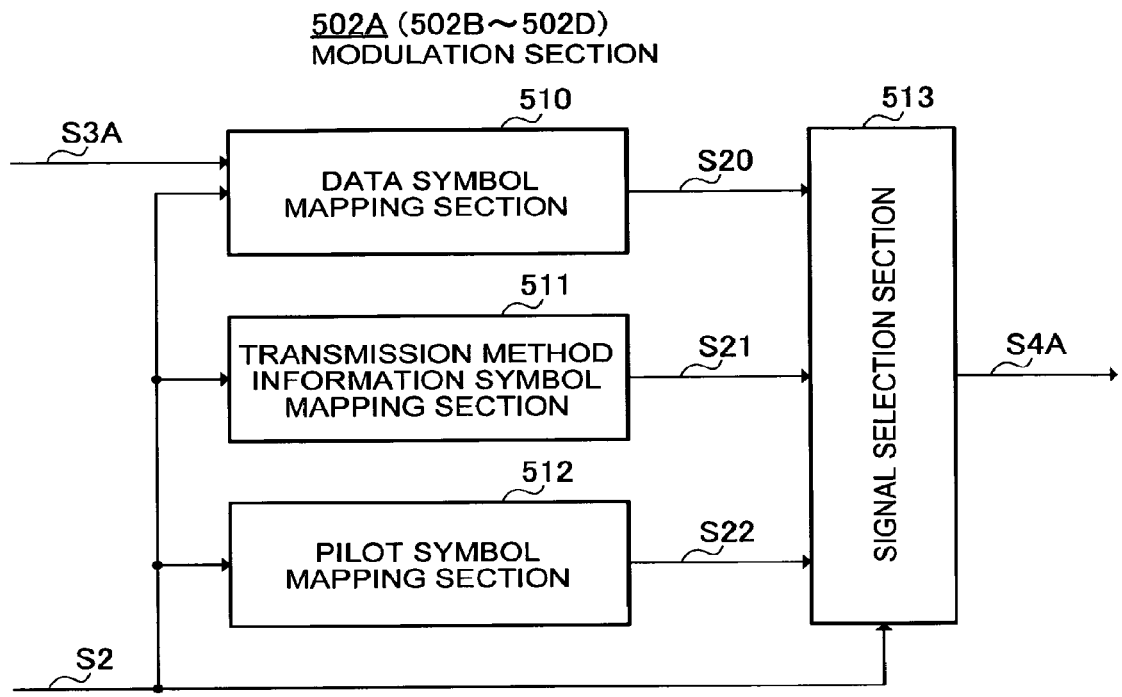
FIG. 15 is a drawing showing the configuration of a modulation section.

FIG. 15 shows the configuration of modulation sections 502A through 502D. As each of modulation sections 502A through 502D has a similar configuration, the configuration of modulation section 502A is shown in FIG. 15 as a representative configuration.

A data symbol mapping section 510 has transmit digital signal S3A and frame configuration signal S2 as input, performs mapping based on the modulation method in the modulation method information contained in frame configuration signal S2, and outputs a data symbol transmit baseband signal S20.

A transmission method information symbol mapping section 511 has frame configuration signal S2 as input, and outputs a transmission method information symbol transmit baseband signal S21 as a symbol indicating transmission method and modulation method information contained in frame configuration signal S2.

A pilot symbol mapping section 512 has frame configuration signal S2 as input, performs mapping for generating a pilot symbol conforming to the transmission method based on transmission method information contained in frame configuration signal S2, and outputs a pilot symbol transmit baseband signal S22.

A signal selection section 513 has data symbol transmit baseband signal S20, transmission method information symbol transmit baseband signal S21, pilot symbol transmit baseband signal S22, and frame configuration signal S2 as input, selects any one of data symbol transmit baseband signal S20, transmission method information symbol transmit baseband signal S21, or pilot symbol transmit baseband signal S22 in accordance with timing information contained in frame configuration signal S2, and outputs the selected signal as transmit baseband signal S4A.

Figure 16:
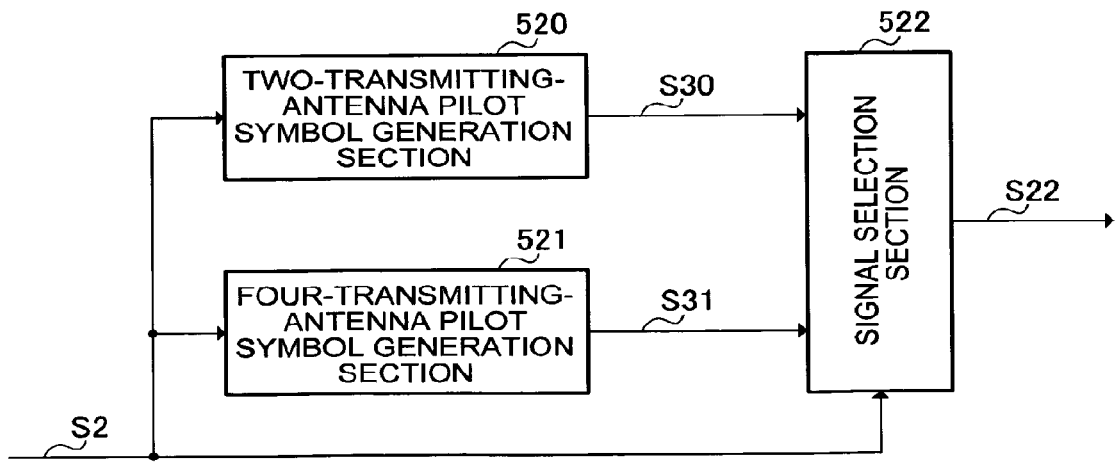
FIG. 16 is a drawing showing the configuration of a pilot symbol mapping section.

FIG. 16 shows the configuration of pilot symbol mapping section 512. Pilot symbol mapping section 512 has a two-transmitting-antenna pilot symbol generation section 520 and a four-transmitting-antenna pilot symbol generation section 521, to both of which frame configuration signal S2 is input. Two-transmitting-antenna pilot symbol generation section 520 generates a pilot symbol comprising the kind of signal point arrangement shown by signal points 201 and 202 in FIG. 6, for example, in accordance with frame configuration signal S2, and outputs this as a pilot symbol baseband signal S30. On the other hand, four-transmitting-antenna pilot symbol generation section 521 generates a pilot symbol comprising the kind of signal point arrangement shown by signal points 401 and 402 in FIG. 10, for example, in accordance with frame configuration signal S2, and outputs this as a pilot symbol baseband signal S31. A signal selection section 522 selects one of pilot symbol baseband signals S30 and S31 in accordance with transmit modulated signal number information contained in frame configuration signal S2, and outputs transmit baseband signal S22. By this means, the pilot symbol transmit power can be changed according to the number of transmit modulated signals.

Figure 17:
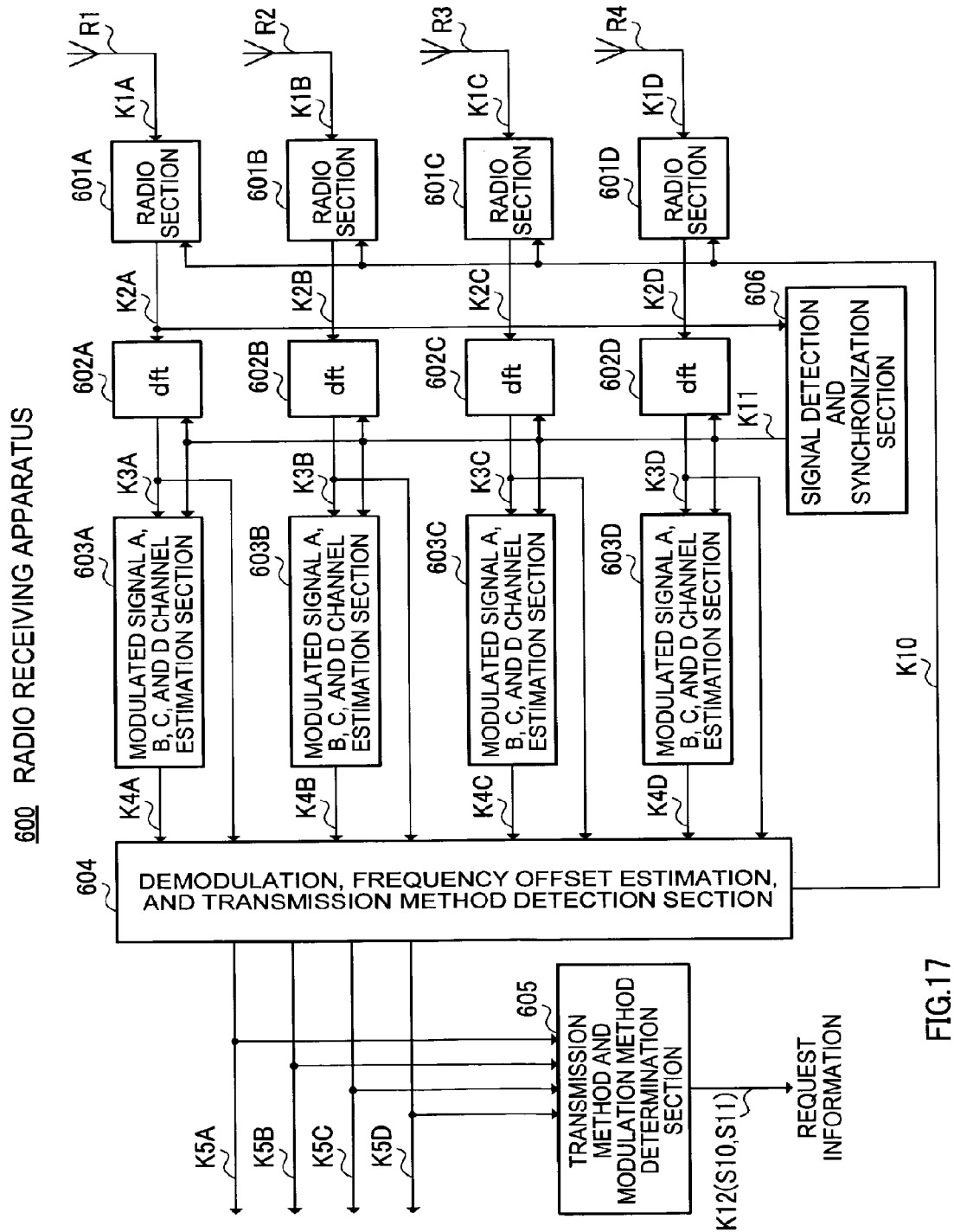
FIG. 17 is a drawing showing the configuration of a radio receiving apparatus of Embodiment 1.

FIG. 17 shows the configuration of a radio receiving apparatus 600 according to this embodiment.

Radio sections 601A through 601D have received signals K1A through K1D received by antennas R1 through R4 respectively, and a frequency offset estimation signal K10, as input, perform frequency control and analog/digital conversion processing based on frequency offset estimation signal K10, and output received baseband signals K2A through K2D.

Fourier transform sections (dft) 602A through 602D have received baseband signals K2A through K2D respectively and a timing signal K11 as input, and output post-Fourier-transform received baseband signals K3A through K3D.

Channel estimation sections 603A through 603D for modulated signals A, B, C, and D have post-Fourier-transform received baseband signals K3A through K3D and timing signal K11 as input, and output channel estimation signals K4A through K4D.

A demodulation, frequency offset estimation, and transmission method detection section 604 has post-Fourier-transform received baseband signals K3A through K3D and channel estimation signals K4A through K4D as input, estimates frequency offset and outputs frequency offset estimation signal K10, and also identifies the transmission method and outputs received digital signals K5A through K5D corresponding to modulated signals A through D respectively by demodulating the data.

A transmission method and modulation method determination section 605 has received digital signals K5A through K5D corresponding to modulated signals A through D as input, calculates the frame error rate, packet loss rate, bit error rate, and so forth, determines the transmission method and modulation method to be requested of the communicating party based on the calculation results, and outputs a request signal K12. That is to say, request signal K12 comprises transmission method request information S10 and modulation method request information S11 shown above in FIG. 14, of which transmission method request information S10 is information that indicates whether modulated signals A and B are to be transmitted from the two transmitting antennas T1 and T2, or modulated signals A through D are to be transmitted from the four transmitting antennas T1 through T4, and modulation method request information S11 is information indicating whether data symbols are to be modulated using the QPSK (Quadrature Phase Shift Keying) method or are to be modulated using the 16QAM (Quadrature Amplitude Modulation) method.

A signal detection and synchronization section 606 has received baseband signal K2A as input, performs signal detection based on signal detection symbol 101 (FIG. 5A, FIG. 5B, FIG. 9A through FIG. 9D) contained in received baseband signal K2A, and also performs time synchronization, and outputs timing signal K11.

Figure 18:
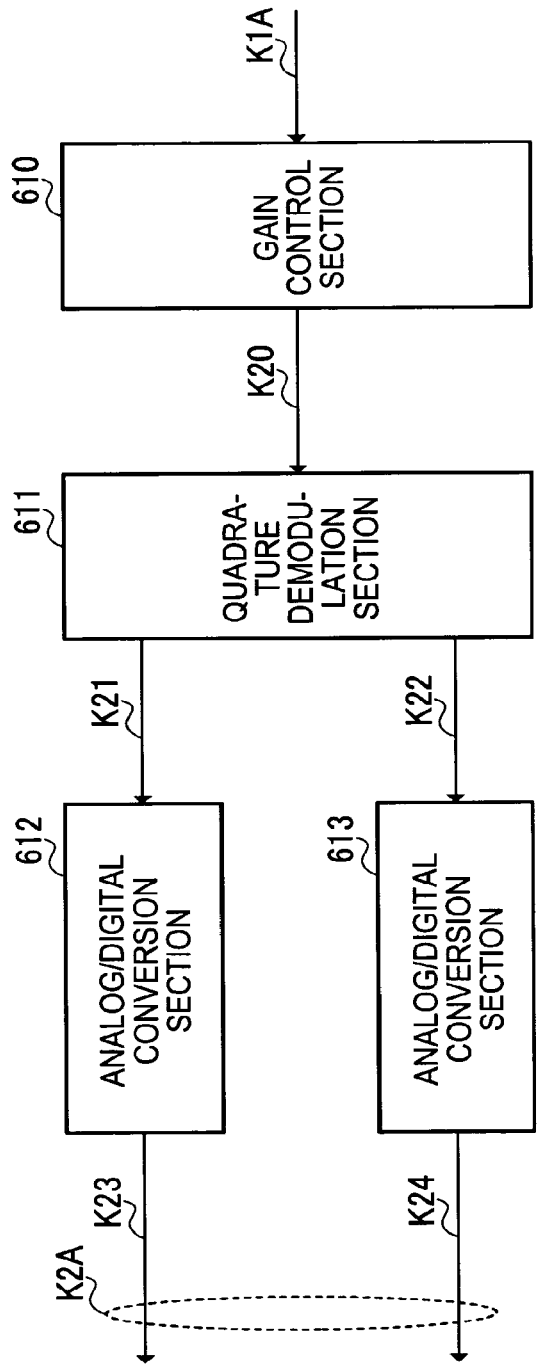
FIG. 18 is a drawing showing the configuration of a radio section.

FIG. 18 shows the configuration of radio sections 601A through 601D. As each of radio sections 601A through 601D has a similar configuration, the configuration of radio section 601A is shown in FIG. 18 as a representative configuration.

A gain control section 610 has received signal K1A as input, and outputs a post-gain-control received signal K20. A quadrature demodulation section 611 has post-gain-control received signal K20 as input, and outputs received quadrature baseband signal phase component K21 and quadrature component K22.

An analog/digital conversion section 612 has received quadrature baseband signal phase component K21 as input, and outputs a received quadrature baseband signal phase component digital signal K23. An analog/digital conversion section 613 has received quadrature baseband signal quadrature component K22 as input, and outputs a received quadrature baseband signal quadrature component digital signal K24.

(3) Operation

Next, the operation of radio transmitting apparatus 500 configured as shown in FIG. 14 through FIG. 16, and radio receiving apparatus 600 configured as shown in FIG. 17 and FIG. 18, will be explained.

Radio transmitting apparatus 500 switches between transmission of two modulated signals A and B using two transmitting antennas T1 and T2, and transmission of four modulated signals A through D using four transmitting antennas T1 through T4, according to transmission method request information S10 requested from radio receiving apparatus 600 (where radio transmitting apparatus 500 receives transmission method request information S10 and modulation method request information S11 by means of a receiving section (not shown)). Specifically, transmission of two modulated signals A and B using two transmitting antennas T1 and T2 is requested by transmission method request information S10 when the frame error rate, packet loss rate, bit error rate, and so forth of transmission method and modulation method determination section 605 in radio receiving apparatus 600 are unsatisfactory, and transmission of four modulated signals A through D using four transmitting antennas T1 through T4 is requested when these rates are satisfactory.

Then the number of transmit modulated signals is set by frame configuration signal generation section 507 and modulation sections 502A through 502D as modulated signal number setting section 11 (FIG. 3) according to transmission method request information S10. Specifically, when two modulated signals A and B are transmitted using two transmitting antennas T1 and T2, based on frame configuration signal S2 generated by frame configuration signal generation section 507, modulation sections 502A and 502B operate, and modulation sections 502C and 502D stop operating. On the other hand, when four modulated signals A through D are transmitted using four transmitting antennas T1 through T4, all of modulation sections 502A through 502D operate.

When two modulated signals A and B are transmitted using two transmitting antennas T1 and T2, pilot symbol mapping section 512 as transmit power changing section 12 (FIG. 3) selects pilot symbol baseband signal S30 obtained by means of two-transmitting-antenna pilot symbol generation section 520. On the other hand, when four modulated signals A through D are transmitted using four transmitting antennas T1 through T4, pilot symbol mapping section 512 selects pilot symbol baseband signal S31 obtained by means of four-transmitting-antenna pilot symbol generation section 521. In this way, pilot symbol transmit power is changed in radio transmitting apparatus 500 according to the number of transmit modulated signals.

As a result, radio receiving apparatus 600 can receive received signals in which the data symbol composite signal operating range and the pilot signal operating range are approximately the same, as shown in FIG. 12D and FIG. 13D. Consequently, quantization error can be reduced when quantization is performed by analog/digital conversion sections 612 and 613 (FIG. 18).

The operation of radio sections 601A through 601D will now be described in detail. As shown in FIG. 18, radio section 601A (601B/601C/601D) adjusts the gain of received signal K1A (K1B/K1C/K1D) by means of gain control section 610. However, at this time it is difficult to perform gain control in units of one frame (assuming one frame to comprise 100 symbols, for example).

operating range of a composite signal of modulated signal A and modulated signal B is −256 to 256, as shown in FIG. 12B. Then, when a pilot signal with an operating range of −128 to 128 is inserted, as shown in FIG. 12C, it is difficult to perform gain control so that the operating range of this pilot signal instantaneously becomes −256 to 256 as shown in FIG. 12D.

However, in this embodiment, as described above, when the composite signal operating range is −256 to 256, a pilot signal is transmitted with its signal point arrangement implemented so that the pilot signal operating range is of the same level as this, thereby enabling pilot symbols with approximately the same operating range as data symbols to be received. The same applies when four modulated signals A through D are transmitted using four transmitting antennas T1 through T4.

When the level of signals input to analog/digital conversion sections 612 and 613 is low, quantization error generally increases. For example, when the pilot signal operating range is small, as in FIG. 12C and FIG. 13C, pilot signal quantization error increases. Then, since channel estimation signals K4A through K4D are output by channel estimation sections 603A through 603D (FIG. 17) after performing channel estimation using the pilot signal, the precision of this estimation degrades due to the quantization error. Similarly, since demodulation, frequency offset estimation, and transmission method detection section 604 (FIG. 17) outputs frequency offset estimation signal K10 after estimating frequency offset using the pilot signal, the precision of this estimation also degrades due to the quantization error. Data demodulation precision degrades due to the above-described degradation of estimation precision, resulting in degradation of reception quality.

In radio transmitting apparatus 500 of this embodiment, the maximum signal point amplitude of each pilot signal is made larger than the maximum signal point amplitude of data symbols in order to suppress this degradation. In addition, the maximum signal point amplitude at time i when only modulated signal A is transmitted is made larger than the maximum signal point amplitude of a pilot symbol at other times. Furthermore, the pilot signal point arrangement when four modulated signals are transmitted from four transmitting antennas, and the pilot signal point arrangement when two modulated signals are transmitted from two transmitting antennas, are changed.

Here, assuming that the data symbol modulation method is QPSK, for example, changing the pilot symbol signal point arrangement is equivalent to changing the ratio of the pilot symbol signal point amplitude to the QPSK signal point amplitude, or changing the ratio of the pilot symbol signal point amplitude to the maximum signal point amplitude of the modulation method. By this means, the ratio of data symbol transmit power to pilot symbol transmit power can be changed according to the number of transmit modulated signals.

Signal point amplitude means the distance between the origin and a signal point in the in-phase I-quadrature Q plane, and increasing the pilot symbol signal point amplitude means increasing the ratio of the pilot symbol signal point amplitude to the maximum signal point amplitude of the modulation method.

(4) Effects

Thus, according to this embodiment, in a system in which the number of simultaneously transmitted modulated signals is varied, pilot symbol quantization error on the receiving side can be reduced by adjusting the signal level of a pilot symbol so as to match the data symbol composite signal level according to the number of modulated signals transmitted. As a result, the precision of radio wave propagation environment estimation, time synchronization, and frequency offset estimation using pilot symbols improves, and consequently data reception quality improves.

Embodiment 2

A particular feature of this embodiment is that, when the number of antennas that transmit modulated signals (that is, the number of modulated signals) changes, the average transmit power of each modulated signal is changed. By this means, it is possible to reduce the quantization error of each modulated signal especially immediately after the number of transmitting antennas is switched.

(1) Principle

First, the principle of this embodiment will be explained.

Figure 19:
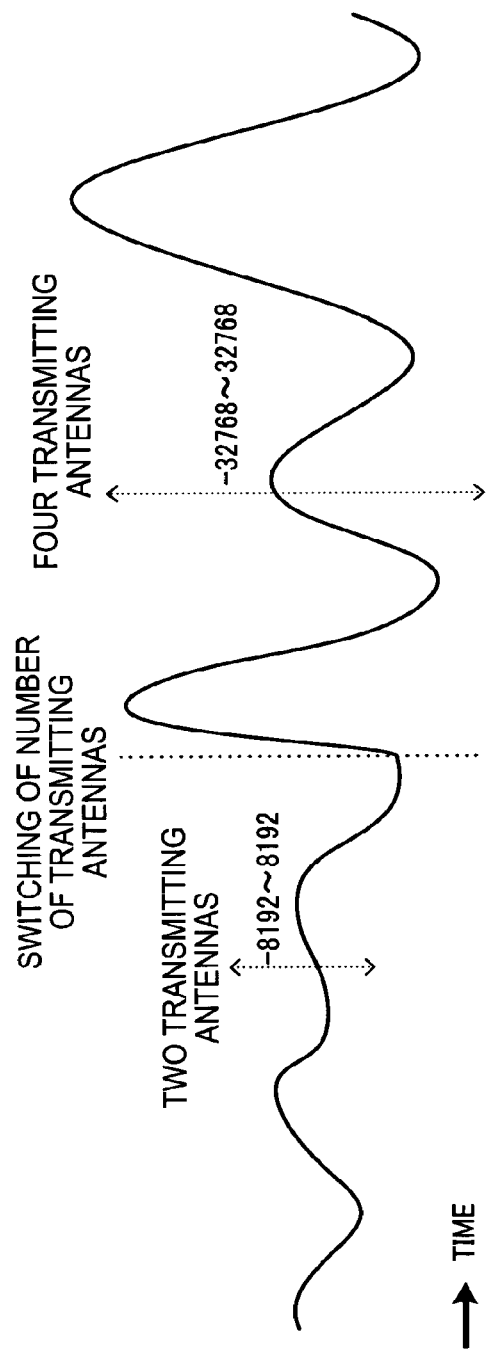
FIG. 19 is a waveform diagram showing variation of a composite signal of modulated signals when the number of transmitting antennas is switched from two to four without performing transmit power control of Embodiment 2.
Figure 20:
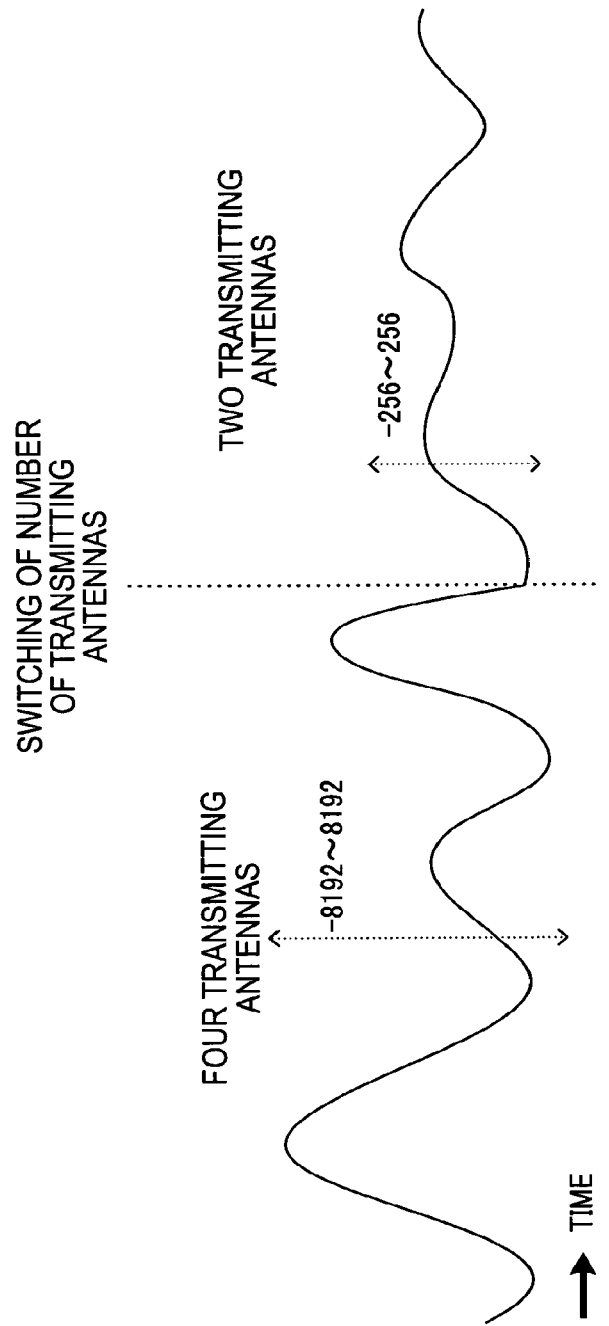
FIG. 20 is a waveform diagram showing variation of a composite signal of modulated signals when the number of transmitting antennas is switched from four to two without performing transmit power control of Embodiment 2.

FIG. 19 and FIG. 20 show variation of a general receive waveform when the number of modulated signals transmitted from a plurality of antennas is switched. FIG. 19 shows a case in which the number of modulated signals transmitted (that is, the number of transmitting antennas) is switched from two to four, and FIG. 20 shows a case in which the number of modulated signals transmitted (the number of transmitting antennas) is switched from four to two. As is clear from FIG. 19, when switching is performed so that the number of modulated signals increases, since the number of combined modulated signals also increases, the received signal operating range increases after switching of the number of antennas. Conversely, as is clear from FIG. 20, when switching is performed so that the number of modulated signals decreases, since the number of combined modulated signals also decreases, the received signal operating range decreases after switching of the number of antennas.

In this embodiment, considering this point, transmit power control is performed so that the modulated signal composite signal level immediately after switching of the number of antennas is made approximately equal to the modulated signal composite signal level before switching of the number of antennas. A radio transmitting apparatus generally performs closed-loop transmit power control or the like that controls transmit power using a TPC (Transmit Power Control) bit sent from the communicating station, and therefore when the number of transmitting antennas is switched and the modulated signal composite signal level changes, the modulated signal transmit power is controlled so that the composite signal level varies within the desired operating range. Also, gain adjustment is performed by a receiving-side gain control section so that the composite signal level varies within the desired operating range. However, with the above-described transmit power control and received signal gain control, a certain response time is necessary for the received signal level to be converged within the desired operating range.

Thus, in this embodiment, the modulated signal composite signal level immediately after switching of the number of antennas is forcibly changed immediately after switching of the number of antennas so as to become approximately equal to the modulated signal composite signal level before switching of the number of antennas.

Figure 21:
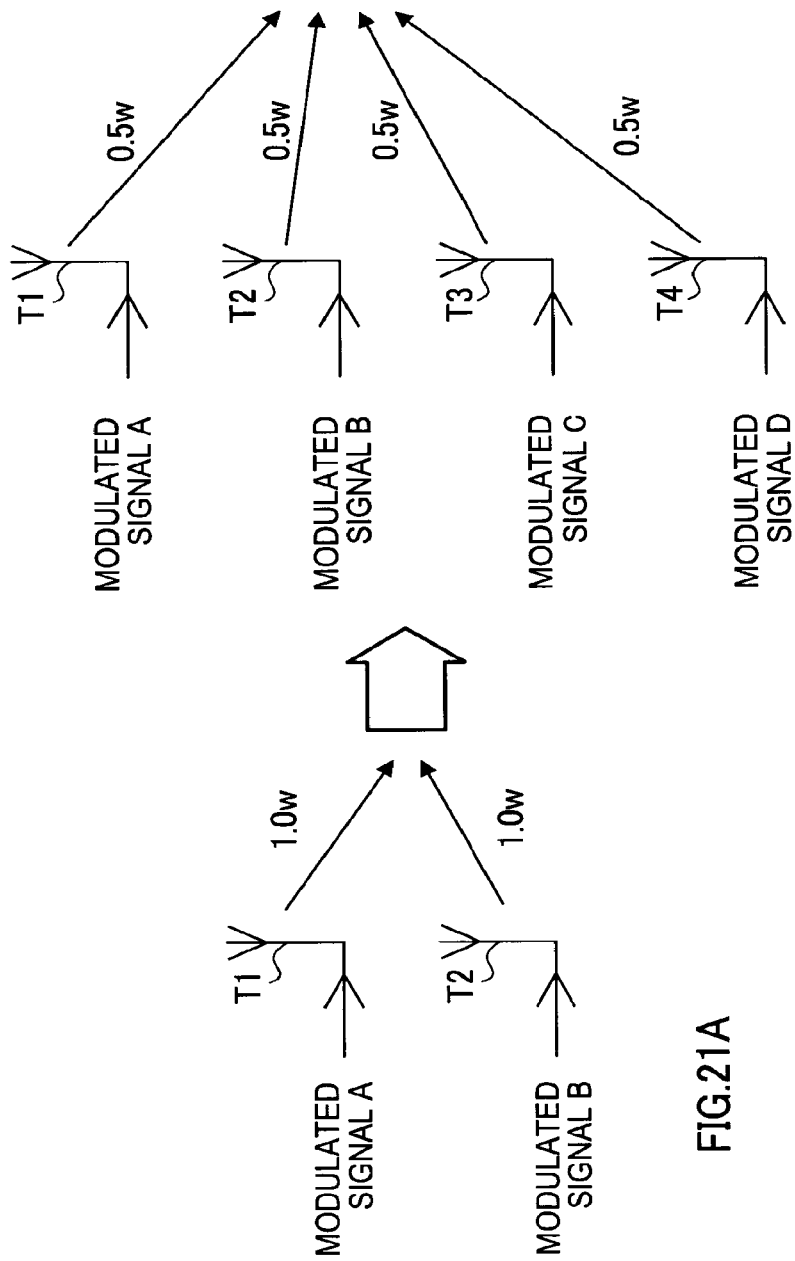
FIG. 21A is a drawing showing the transmit power of each modulated signal when the number of transmitting antennas is two.
FIG. 21B is a drawing showing the transmit power of each modulated signal when the number of transmitting antennas is switched to four.
Figure 22:
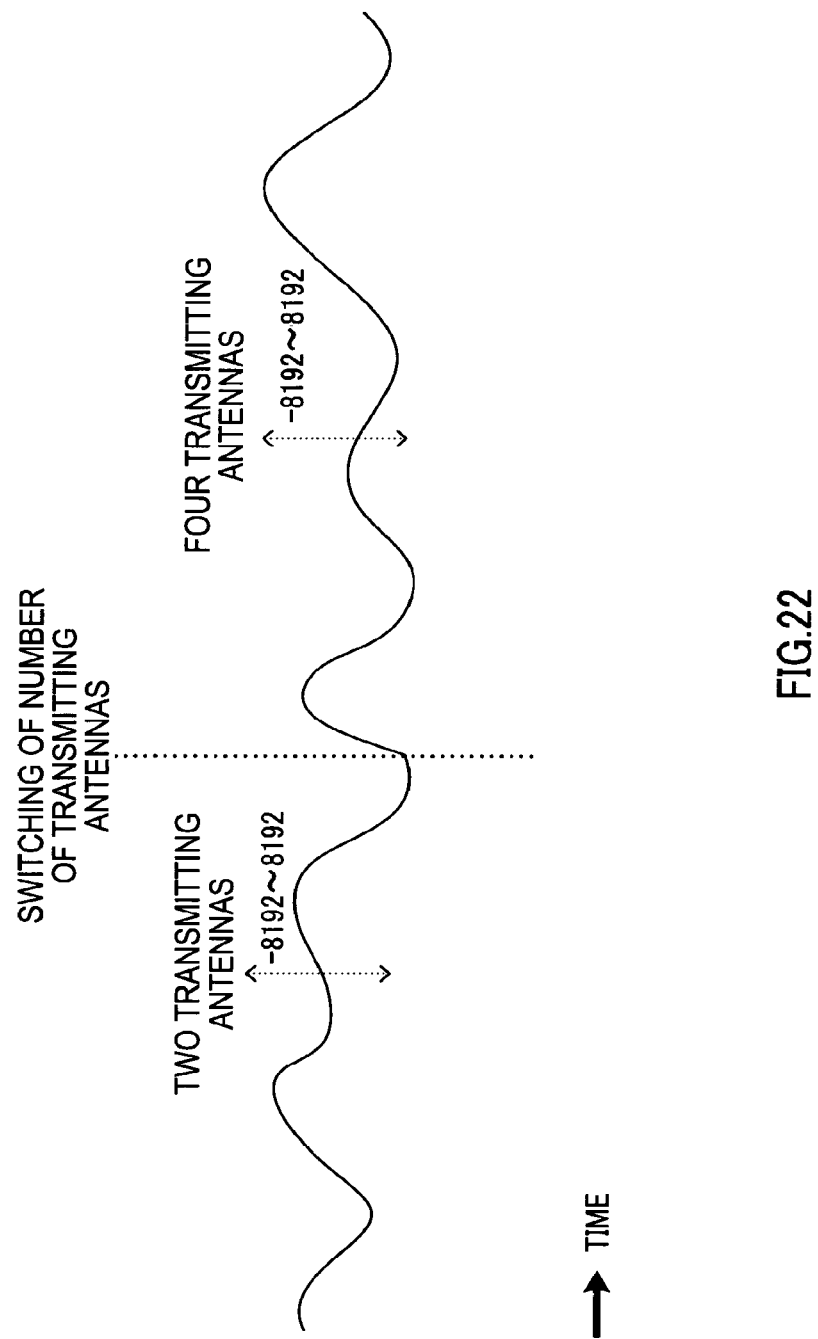
FIG. 22 is a waveform diagram showing variation of a composite signal of modulated signals when transmit power control of Embodiment 2 is applied when the number of transmitting antennas is switched from two to four.

FIG. 21A and FIG. 21B show a schematic representation of transmit power control of modulated signals A through D according to this embodiment when switching is performed from a state in which two modulated signals A and B are transmitted using two transmitting antennas T1 and T2, to a state in which four modulated signals A through D are transmitted using four transmitting antennas T1 through T4. Initially, as shown in FIG. 21A, modulated signal A with average transmit power of 1.0 W is being transmitted from antenna T1, and modulated signal B with average transmit power of 1.0 W is being transmitted from antenna T2. Then switching is performed from the transmission method in which two modulated signals A and B are transmitted using two transmitting antennas T1 and T2, to a transmission method in which four modulated signals A through D are transmitted using four transmitting antennas T1 through T4. At this time, modulated signals A through D with average transmit power of 0.5 W are transmitted from transmitting antennas T1 through T4 respectively. By this means, the composite signal level of modulated signals A through D immediately after switching of the number of antennas can be made equal to the composite signal level of modulated signals A and B before switching of the number of antennas, as shown in FIG. 22.

FIG. 23A and FIG. 23B show a schematic representation of transmit power control of modulated signals A through D according to this embodiment when switching is performed from a state in which four modulated signals A through D are transmitted using four transmitting antennas T1 through T4, to a state in which two modulated signals A and B are transmitted using two transmitting antennas T1 and T2. Initially, as shown in FIG. 23A, modulated signals A through D with average transmit power of 0.5 W are being transmitted from transmitting antennas T1 through T4 respectively. Then switching is performed from the transmission method in which four modulated signals A through D are transmitted using four transmitting antennas T1 through T4, to a transmission method in which two modulated signals A and B are transmitted using two transmitting antennas T1 and T2. At this time, modulated signals A and B with average transmit power of 1.0 W are transmitted from antennas T1 and T2 respectively. By this means, the composite signal level of modulated signals A and B immediately after switching of the number of antennas can be made equal to the composite signal level of modulated signals A through D before switching of the number of antennas, as shown in FIG. 24.

Moreover, in this embodiment, in addition to controlling the modulated signal transmit power so that the composite signal level of modulated signals transmitted immediately after switching of the number of antennas becomes the same as the composite signal level of modulated signals transmitted before switching of the number of antennas, after switching of the number of antennas the transmit level of each modulated signal is gradually restored to the transmit level of each modulated signal before switching of the number of antennas. By this means, the precision of modulated signal demodulation can be further improved.

This transmit power control will now be explained using FIG. 25 and FIG. 26. FIG. 25 shows an example of transmit power control of modulated signals A through D when switching is performed from a state in which two modulated signals A and B are transmitted using two transmitting antennas T1 and T2, to a state in which four modulated signals A through D are transmitted using four transmitting antennas T1 through T4. As shown in FIG. 25, immediately after the number of antennas is switched the average transmit power of transmit signals transmitted from antennas T1 through T4 is changed to 0.5 W. Then, as time passes, the average transmit power is changed to 0.75 W and 1.0 W.

The power amplifier used to amplify the average transmit power of modulated signals A through D is a transmit power amplifier in which distortion does not occur in the frequency spectrum, as illustrated in FIG. 27A, even though the average transmit power of modulated signals A through D is made 1 W. Thus, in both the case where the number of modulated signals transmitted is two and the case where the number of modulated signals transmitted is four, even when the average transmit power is made 1 W a frequency spectrum in which distortion occurs as shown in FIG. 27B is not produced, and a frequency spectrum in which distortion does not occur as shown in FIG. 27A can be obtained.

FIG. 26 shows an example of transmit power control of modulated signals A through D when switching is performed from a state in which four modulated signals A through D are transmitted using four transmitting antennas T1 through T4, to a state in which two modulated signals A and B are transmitted using two transmitting antennas T1 and T2. As shown in FIG. 26, immediately after the number of antennas is switched the average transmit power of transmit signals transmitted from antennas T1 and T2 is changed to 1.0 W. Then, as time passes, the average transmit power is changed to 0.75 W and 0.5 W.

Abruptly lowering the average transmit power of each modulated signal immediately after the number of transmitting antennas is increased, and then restoring the average transmit power of each modulated signal to its pre-switching level over time, as shown in FIG. 25, are done so that the average transmit power before switching is subjected to transmit power control that enables a good SIR (Signal to Interference Ratio) to be obtained by the receiving apparatus, and restoring the average transmit power improves the reception quality of each modulated signal. Also, taking the power consumption and distortion of the power amplifier into consideration, it is better to set appropriate average power. Therefore, the average transmit power is better to be restored to the original average transmit power. Abruptly raising the average transmit power of each modulated signal immediately after the number of antennas is decreased, and then restoring the average transmit power of each modulated signal to its pre-switching level over time, as shown in FIG. 26, are also done for the same reason.

When the abruptly lowered average transmit power of each modulated signal is restored to its original level in this way, by carrying out the restoration gradually over a certain period of time, the gain control section of the receiving apparatus is able to keep up with this process, and the post-gain-control signal can be accommodated within the operating range of the analog/digital conversion section. Also, when the abruptly raised average transmit power of each modulated signal is restored to its original level, by carrying out the restoration gradually over a certain period of time, the gain control section of the receiving apparatus is able to keep up with this process, and the post-gain-control signal can be raised to a level at which quantization error does not occur in the analog/digital conversion section. That is to say, the speed at which the average transmit power of each modulated signal abruptly lowered or abruptly raised at the same time as switching of the number of antennas is restored to its original level should be selected according to the operating speed of the gain control section.

(2) Configuration

Figure 28:
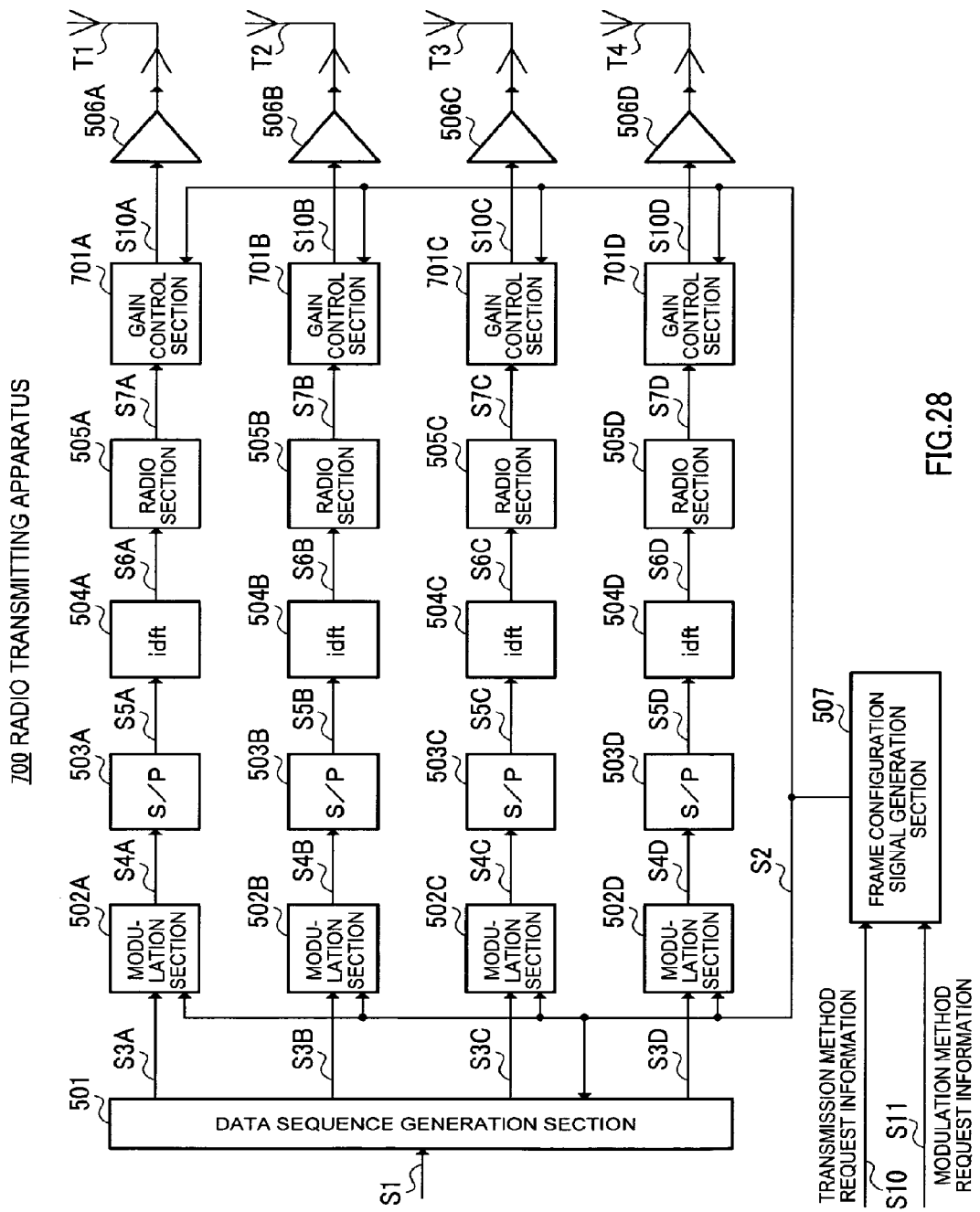
FIG. 28 is a block diagram showing the configuration of a radio transmitting apparatus of Embodiment 2.

FIG. 28, in which parts corresponding to those in FIG. 14 are assigned the same codes as in FIG. 14, shows the configuration of a radio transmitting apparatus 700 according to this embodiment. Descriptions of parts corresponding to those in FIG. 14 are omitted here.

Gain control sections 701A through 701D have transmit signals S7A through S7D respectively, and frame configuration signal S2, as input, detect information on switching of the transmission method from transmission method information contained in frame configuration signal S2, and when the transmission method is switched, perform gain control and output post-gain-control transmit signals S10A through S10D.

Figure 3:
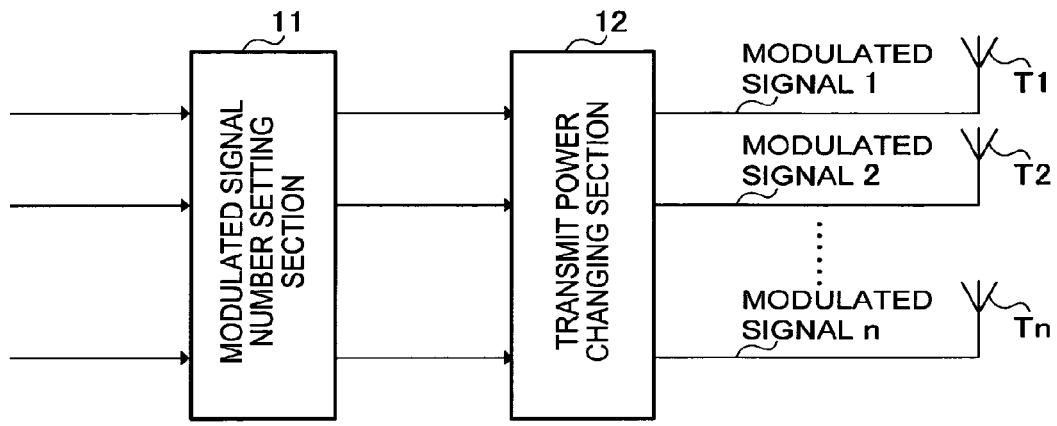
FIG. 3 is a block diagram showing the basic configuration of a radio transmitting apparatus of the present invention.

That is to say, in this embodiment, gain control sections 701A through 701D function as transmission power changing section 12 in FIG. 3, and change the average transmit power of each modulated signal according to the number of transmit modulated signals. Actually, as described above, the average transmit power of each modulated signal is abruptly lowered at the same time when the number of transmit modulated signals increases, and is abruptly raised at the same time when the number of transmit modulated signals decreases.

(3) Operation

Next, the operation of radio transmitting apparatus 700 configured as shown in FIG. 28 will be explained.

The procedures and operations whereby radio receiving apparatus 600 shown in FIG. 17 issues a transmission method change request to radio transmitting apparatus 700 in FIG. 28, and radio transmitting apparatus 700 in FIG. 28 switches the transmission method are similar to those in the description of Embodiment 1.

Gain control sections 701A through 701D have transmit signals S7A through S7D respectively, and frame configuration signal S2, as input, detect information on switching of the transmission method from transmission method information contained in frame configuration signal S2, and when the transmission method is switched, perform gain control and output post-gain-control transmit signals S10A through S10D.

At this time, the amplified gain is a coefficient that gives average transmit power such as shown in FIG. 21A, FIG. 21B, and FIG. 22. Gain control may also be performed that gradually restores the average transmit power to its original level after switching of the transmission method, as shown in FIG. 25 and FIG. 26.

The operating range of radio sections 601A through 601D in radio receiving apparatus 600 shown in FIG. 17, and more specifically analog/digital conversion sections 612 and 613 in FIG. 18 -assuming the use of a 14-bit analog/digital converter by analog/digital conversion sections 612 and 613, for example is −8192 to 8192. Gain control section 610 performs received signal gain control so that the level of post-gain-control received signal K20 is within this operating range. This is the reason why the operating range of the composite signal of modulated signals prior to switching of the number of transmitting antennas shown in FIG. 19 and FIG. 20 just fits into the range −8192 to 8192.

However, immediately after switching of the number of transmitting antennas, gain control section 610 cannot keep up with the level fluctuation of the modulated signal composite signal, and gain control such that the composite signal operating range just fits into the range −8192 to 8192 cannot be performed. Assuming, for example, that each modulated signal is transmitted at the same average transmit power before and after switching of the number of transmitting antennas, when the number of transmitting antennas (that is, the number of transmit modulated signals) is increased from two to four, the operating range of the composite signal of the four modulated signals after switching of the number of transmitting antennas becomes −32768 to 32768 as shown in FIG. 19 and exceeds the −8192 to 8192 operating range of analog/digital conversion sections 612 and 613, resulting in occurrence of quantization error. Similarly, when the number of transmitting antennas (that is, the number of transmit modulated signals) is decreased from four to two, the operating range of the composite signal of the two modulated signals after switching of the number of transmitting antennas becomes −256 to 256 as shown in FIG. 20, considerably smaller than the −8192 to 8192 operating range of analog/digital conversion sections 612 and 613, and quantization error occurs.

Figure 23:
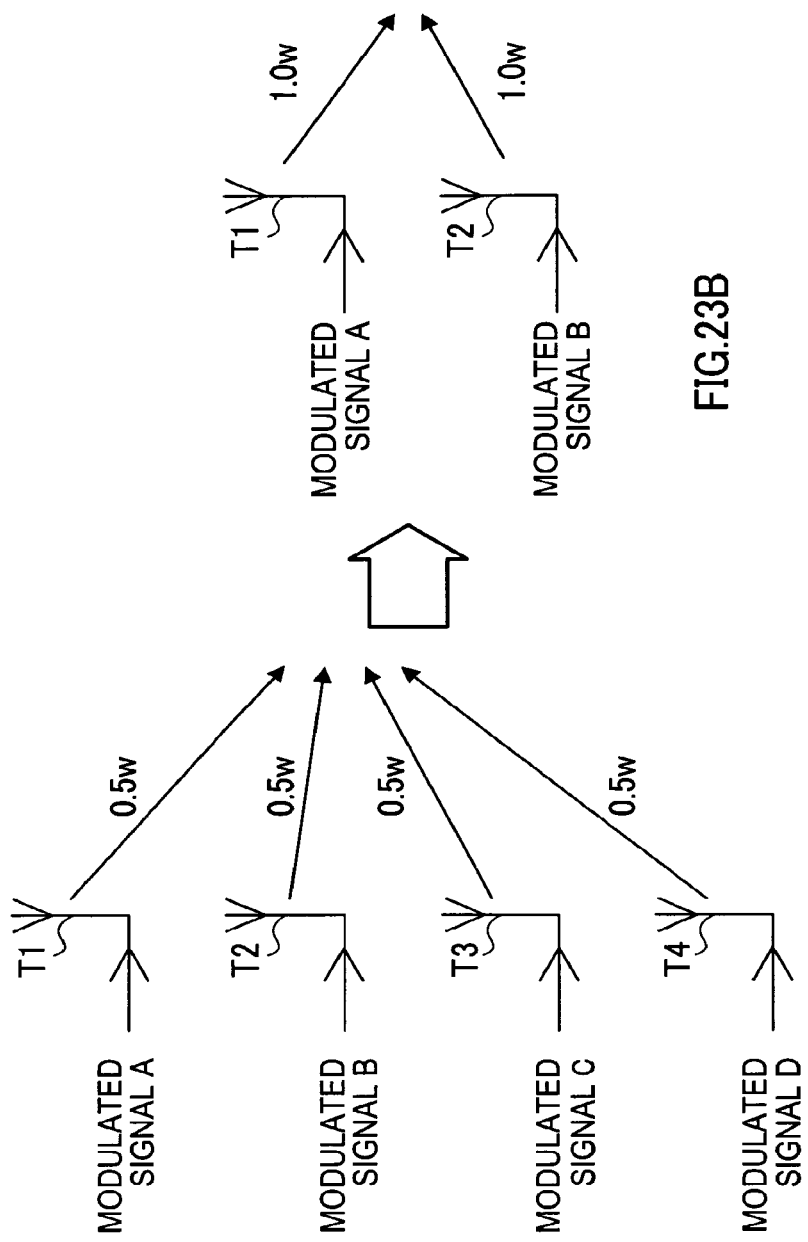
FIG. 23A is a drawing showing the transmit power of each modulated signal when the number of transmitting antennas is four.
FIG. 23B is a drawing showing the transmit power of each modulated signal when the number of transmitting antennas is switched to two.
Figure 24:
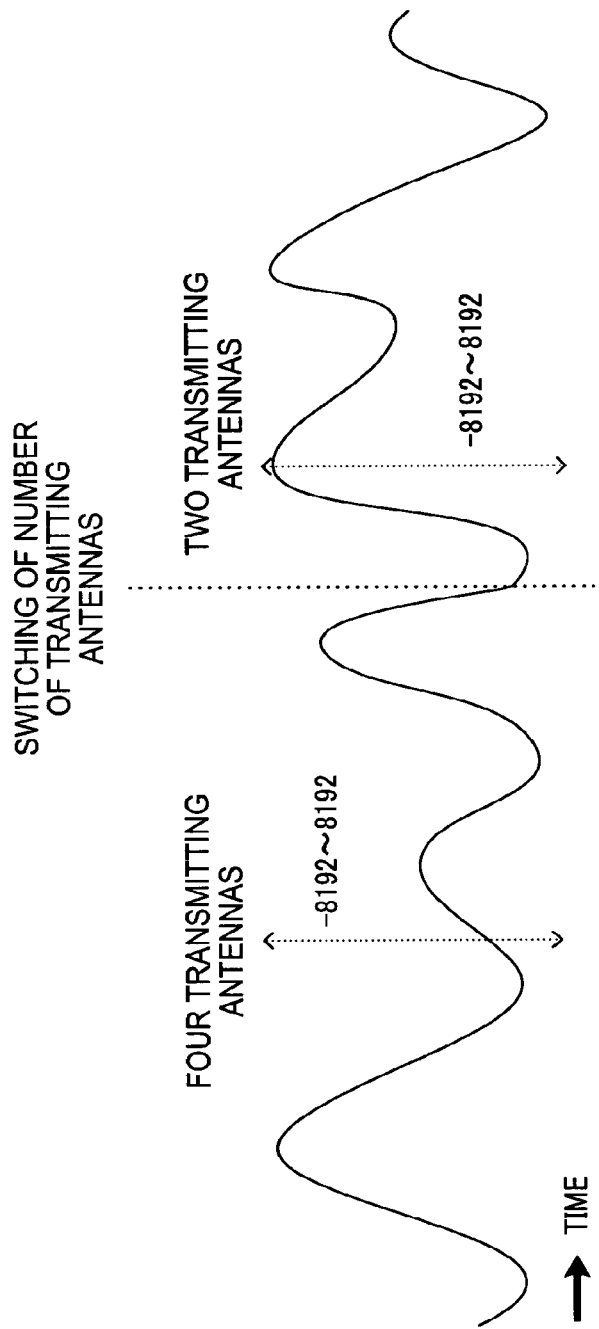
FIG. 24 is a waveform diagram showing variation of a composite signal of modulated signals when transmit power control of Embodiment 2 is applied when the number of transmitting antennas is switched from four to two.

However, with the above-described configuration of this embodiment, since the average transmit power of each modulated signal is abruptly lowered when the number of transmit modulated signals increases, and abruptly raised when the number of transmit modulated signals decreases, the modulated signal composite signal level immediately after switching of the number of antennas can be adjusted to the −8192 to 8192 operating range of analog/digital conversion sections 612 and 613 independently of gain control section 610 as shown in FIG. 23 and FIG. 24.

As a result, quantization error of analog/digital conversion sections 612 and 613 after switching of the number of transmit modulated signals is performed can be reduced. Therefore, frequency offset estimation precision, channel estimation precision, and demodulation precision can be secured, making it possible to prevent degradation of data reception quality immediately after switching of the number of modulated signals is performed.

(4) Effects

Thus, according to this embodiment, in a system in which the number of simultaneously transmitted modulated signals is varied, quantization error occurring when analog/digital conversion of a received signal is performed can be reduced by switching the average transmit power of each modulated signal according to the number of transmit modulated signals when the number of modulated signals transmitted is switched, enabling reception quality to be improved.

Embodiment 3

In this embodiment, a specific example will be described of a case in which the method whereby pilot symbol and modulated signal transmit power is changed according to the number of antennas that simultaneously transmit modulated signals (the number of modulated signals) described in Embodiments 1 and 2 is applied to an actual radio system. Specifically, in this embodiment, a method is described whereby gain control is stabilized by lengthening the gain control time of AGC (Automatic Gain Control) in a receiving apparatus.

In a typical receiving apparatus, when input of a signal to the receiving apparatus is detected, AGC is performed in accordance with the input signal level so that the received signal is within the dynamic range of the A/D converter that performs analog/digital conversion. There are two possible methods of stabilizing gain control by means of AGC, as follows:

(i) Stabilizing the dynamic range of a signal input to the receiving apparatus (ii) Lengthening the time for gain control It was shown in Embodiments 1 and 2 that method (i) can be implemented by increasing the transmit power of pilot symbols contained in modulated signals, or forcibly changing the transmit power of modulated signals. In this embodiment, a pilot symbol transmit power changing method is described that enables (ii) also to be implemented while implementing (i).

As a MIMO system according to this embodiment, the case shown in FIG. 8 will be described in which modulated signal A, modulated signal B, modulated signal C, and modulated signal D are simultaneously transmitted from four antennas T1, T2, T3, and T4 respectively, signals in which modulated signals A, B, C, and D are combined are received by four antennas R1, R2, R3, and R4, and these signals are separated and demodulated.

To compare this embodiment with Embodiment 1, "(1) Principle" of Embodiment 1 and "(4) Effects" of Embodiment 1 are different, but "(2) Configuration" of Embodiment 1 and "(3) Operation" of Embodiment 1 are the same as described in Embodiment 1, and therefore descriptions of "(2) Configuration" of Embodiment 1 and "(3) Operation" of Embodiment 1 are omitted here.

It is necessary for 4×4=16 channel fluctuations h11(t), h21(t), h31(t), h41(t), . . . , h44(t) shown in FIG. 8 to be estimated and demodulated on the receiving side. It is therefore necessary for pilot symbols such as symbols for signal detection, control symbols for frequency offset estimation and time synchronization, transmission method information symbols, and radio wave propagation environment estimation symbols, to be provided in modulated signals A, B, C, and D. Here, time synchronization can be achieved using the correlation of signal detection symbols, frequency offset estimation symbols, guard intervals, and so forth, and will therefore not be included in the following description.

FIG. 29A through FIG. 29D show sample frame configurations of modulated signals A, B, C, and D. As an example, FIG. 29A through FIG. 29D show frame configurations on time-frequency axes when modulated signals A, B, C, and D are OFDM signals. In FIG. 29A through FIG. 29D, reference code 2701 denotes a symbol for signal detection (corresponding to 101 in FIG. 9A through FIG. 9D), reference code 2702 denotes a symbol for gain control (corresponding to 102 in FIG. 9A through FIG. 9D), reference code 2703 denotes a symbol for frequency offset estimation (corresponding to 102 in FIG. 9A through FIG. 9D), reference code 2704 denotes a transmission method information symbol (corresponding to 103 in FIG. 9A through FIG. 9D), reference code 2705 denotes a radio wave propagation environment estimation symbol (corresponding to 104 in FIG. 9A through FIG. 9D), and reference code 2706 denotes a data symbol (corresponding to 105 in FIG. 9A through FIG. 9D).

Of the pilot symbols, signal detection symbol 2701, gain control symbol 2702, frequency offset estimation symbol 2703, and transmission method information symbol 2704 exist only in modulated signal A (that is to say, are non-multiplexed symbols), and have a configuration whereby communication is performed. The characteristics of this configuration are described below.

When frequency offset is estimated on the receiving side, if frequency offset estimation symbols 2703 are transmitted from a plurality of transmitting antennas (at least two of T1, T2, T3, and T4), these frequency offset estimation symbols 2703 are received in multiplexed form by four receiving antennas R1, R2, R3, and R4. In this case, the necessity arises of performing channel estimation accurately and separating the received signals.

Figure 29A:
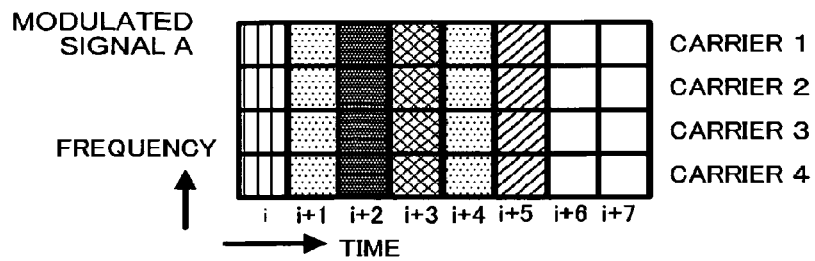
FIG. 29A is a drawing showing a sample frame configuration of modulated signal A.
Figure 29B:
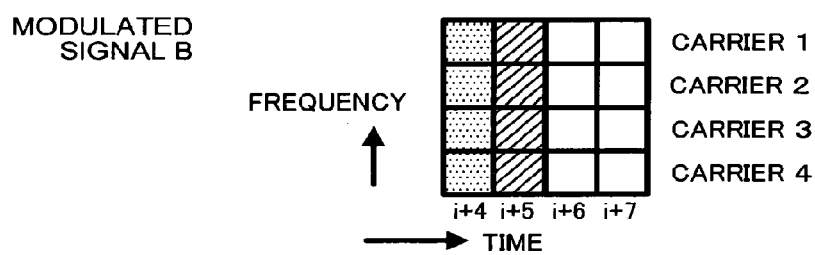
FIG. 29B is a drawing showing a sample frame configuration of modulated signal B.
Figure 29C:
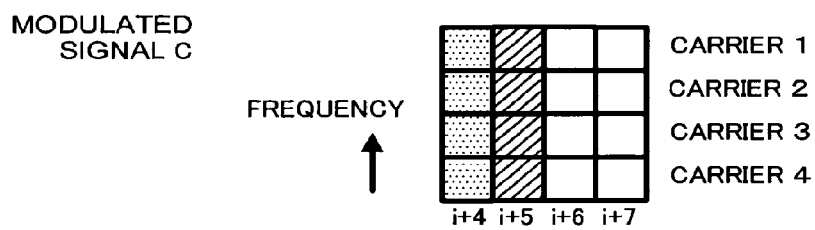
FIG. 29C is a drawing showing a sample frame configuration of modulated signal C.
Figure 29D:
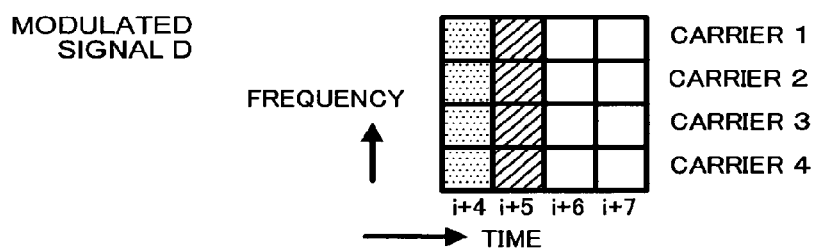
FIG. 29D is a drawing showing a sample frame configuration of modulated signal D.

On the other hand, when frequency offset estimation symbol 2703 is transmitted only from transmitting antenna T1, as in the case of modulated signal A in FIG. 29A, it is not necessary for received signals to be separated by the receiving apparatus. This enables frequency offset estimation to be performed more simply and more accurately.

For the same reason, transmission method information symbol 2704 is also transmitted only from one transmitting antenna, T1. At this time, gain control is performed using gain control symbol 2702, and the quantization error of frequency offset estimation symbol 2703 and transmission method information symbol 2704 is small.

On the other hand, transmission of radio wave propagation environment estimation symbol 2705 is performed from each of transmitting antennas T1, T2, T3, and T4. This is because it is necessary to estimate the 4×4=16 channel fluctuations shown in FIG. 8.

Next, a method of "(i) stabilizing the dynamic range of a signal input to the receiving apparatus" and "(ii) lengthening the gain control time" using pilot symbols according to this embodiment will be described, together with its effects.

A method of increasing pilot symbol power in order to stabilize the dynamic range of signals input to a receiving apparatus has been described in Embodiment 1. Application of this method to modulated signals A, B, C, and D in FIG. 29A through FIG. 29D will be considered.

Figure 30:
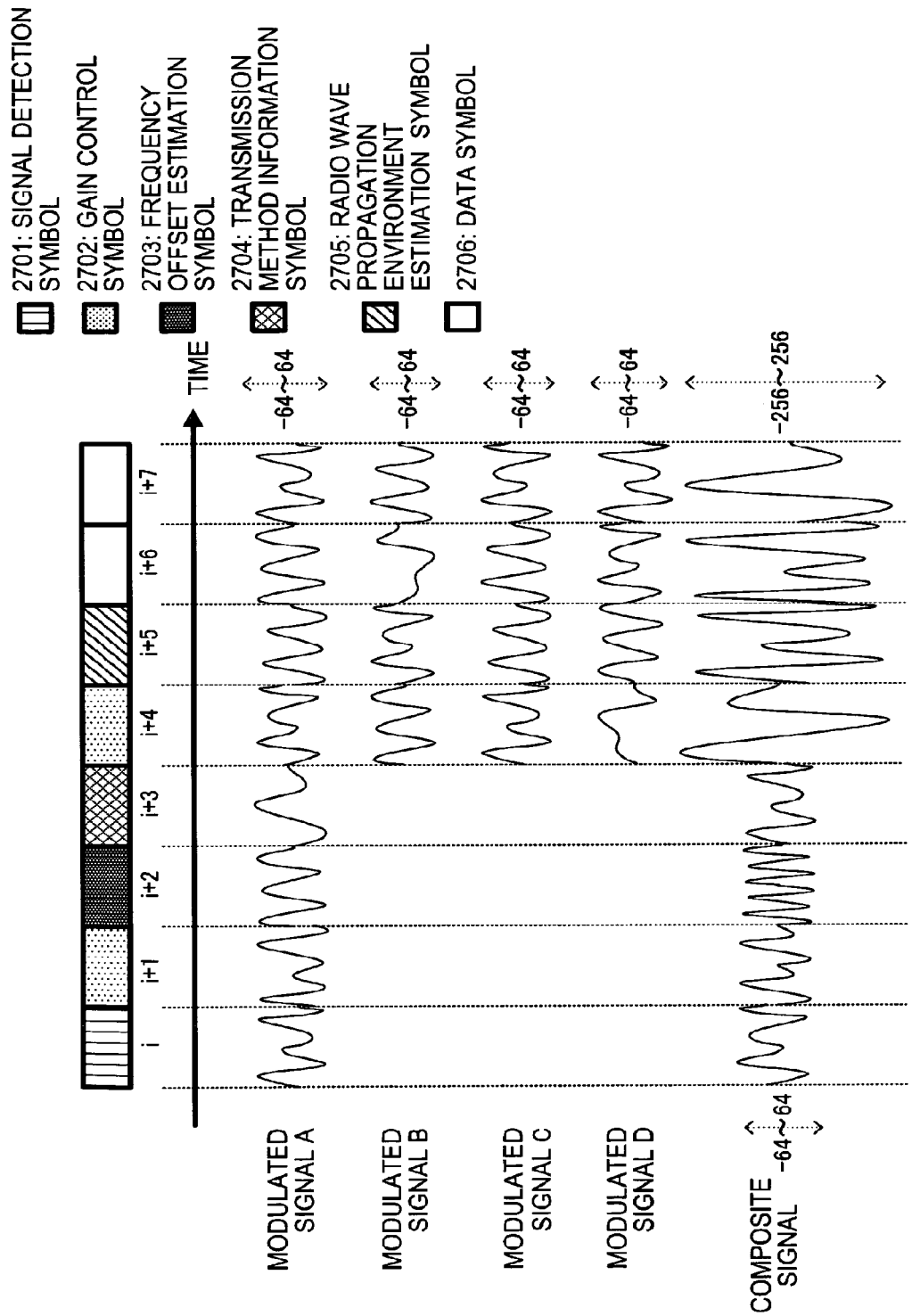
FIG. 30 is a waveform diagram showing an example of transmit waveforms when the ratio of the composite signal operating range to the operating range of each modulated signal is 4 when four modulated signals are transmitted by four transmitting antennas.

FIG. 30 shows an example of waveforms of modulated signals on the time axis when modulated signals A, B, C, and D shown in FIG. 29A through FIG. 29D are transmitted. Waveforms relating to modulated signals A through D shown in FIG. 30 are modulated signal A, B, C, and D pilot symbol and data symbol waveforms. The composite signal in FIG. 30 shows the waveform of the composite signal of modulated signals A, B, C, and D. Here, time i of the composite signal is the time corresponding to time i at which each symbol is transmitted.

As shown in FIG. 30, the operating range of pilot symbols and data symbols of modulated signals A, B, C, and D is assumed to be −64 to 64, for example. Then, as shown in the figure, the signal combining the four modulated signals A, B, C, and D has an operating range of −64 to 64 from time i to time i+3 (when only modulated signal A is transmitted), and has an operating range of −256 to 256 from time i+4 to time i+7 (when modulated signals A, B, C, and D are transmitted). These values are not exact, but the operating range from time i+4 to time i+7 is larger than the operating range from time i to time i+3. Here, the ratio of the composite signal operating range to the operating range of each modulated signal when four modulated signals are transmitted by four transmitting antennas is assumed to be 4. In this embodiment, the ratio of the operating range from time i to time i+3 (when only modulated signal A is transmitted) to the operating range from time i+4 to time i+7 (when modulated signals A, B, C, and D are transmitted) is considered, and "(ii) lengthening the gain control time" above is implemented by making this ratio approach 1.

In the radio communication illustrated in FIG. 30, communication can be performed with time i to time i+3 (when only modulated signal A is transmitted) and time i+4 to time i+7 (when modulated signals A, B, C, and D are transmitted) considered independently.

In time i to time i+3, after a signal is detected in time i, the operating range of gain control symbol 2702 (time i+1) is set in line with the operating ranges of frequency offset estimation symbol 2703 (time i+2) and transmission method information symbol 2704 (time i+3) on the receiving side. For example, transmission is performed with the operating ranges of the three symbols 2702, 2703, and 2704 made the same (−64 to 64) as shown in FIG. 30.

Considering time i+4 onward separately from the period up to and including time i+3, the operating range of gain control symbol 2702 (time i+4) is set in line with the operating ranges of radio wave propagation environment estimation symbol 2705 (time i+5) and data symbols 2706 (time i+6 and time i+7) so that the operating ranges of the composite signal on the receiving side become equal. For example, the operating ranges of modulated signals A, B, C, and D are made equal (−64 to 64) as shown in FIG. 30. At this time, AGC for symbols from time i+5 onward is performed using gain control symbol 2702 in time i+4, and therefore it is desirable to lengthen the time of gain control symbol 2702 in order to perform stable AGC. However, the longer the time allocated to gain control symbol 2702, the greater is the decline in data transmission efficiency.

Also, as explained in Embodiment 1 using FIG. 13A through FIG. 13D, when the composite signal shown in FIG. 30 changes from time i+3 to time i+4, the operating range fluctuates greatly, and therefore quantization error in the A/D conversion section of the receiving apparatus increases, and modulated signal A, B, C, and D data symbol separation precision and demodulation precision fall. As a response to the problem of "the operating range fluctuating greatly" mentioned here, a method was described in Embodiment 1 whereby "pilot symbol quantization error on the receiving side can be reduced by adjusting the signal level of a pilot symbol so as to match the data symbol composite signal level according to the number of modulated signals transmitted."

Thus, as a method of reducing quantization error and lengthening the AGC gain control time using the method in Embodiment 1, the ratio of the operating range when only modulated signal A is transmitted (from time i to time i+3) to the operating range when modulated signals A, B, C, and D are transmitted (from time i+4 to time i+7) is made to approach 1. By this means, symbols in a period in which only modulated signal A is transmitted can also be used in AGC gain control, and "(ii) lengthening the gain control time" above can be achieved.

Figure 31:
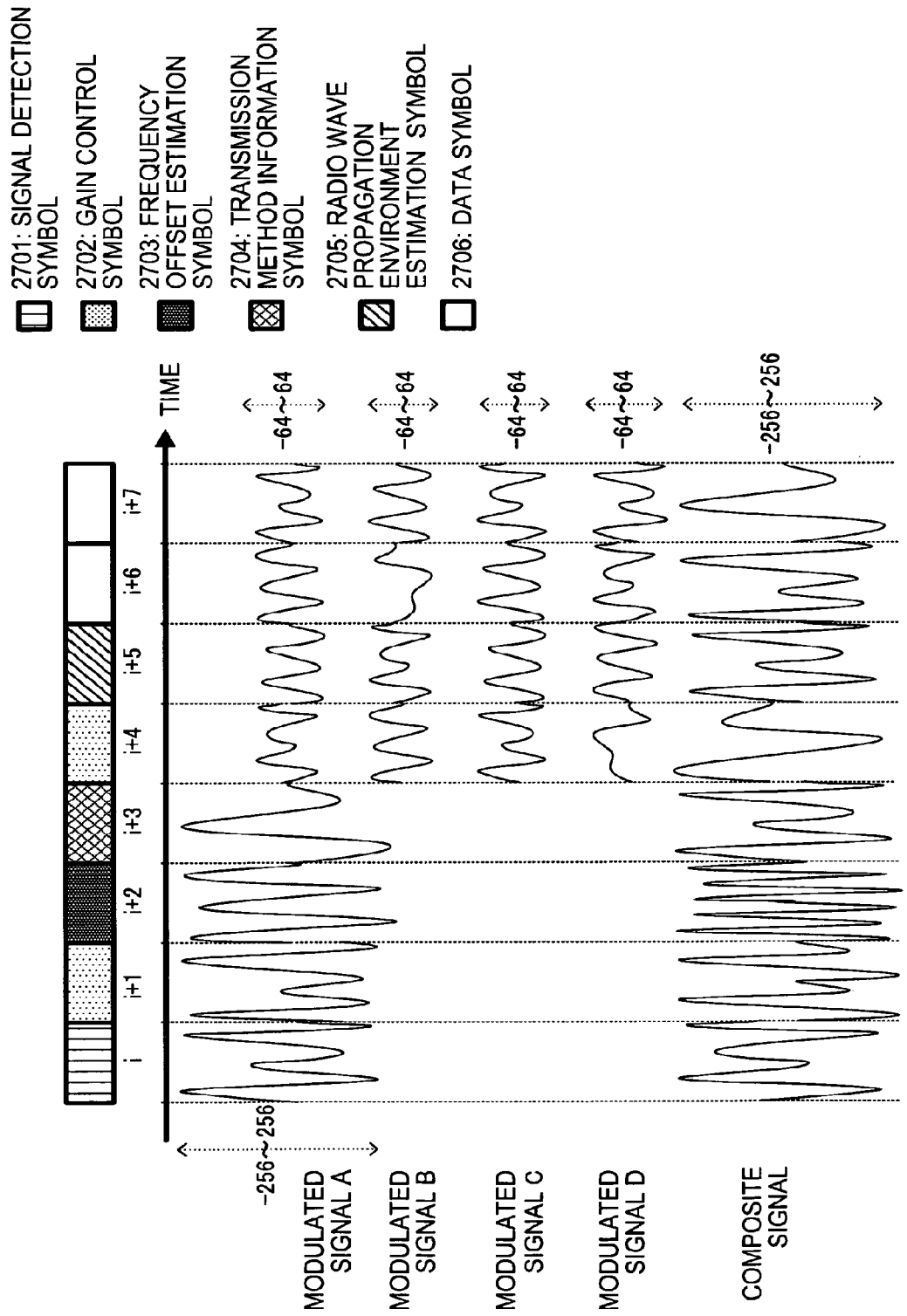
FIG. 31 is a waveform diagram showing an example of transmit waveforms when the ratio of the composite signal operating range to the operating range of each modulated signal is 1 when four modulated signals are transmitted by four transmitting antennas.

FIG. 31 shows an example of waveforms of modulated signals on the time axis when the transmit power of pilot symbols in a period in which only modulated signal A is transmitted (from time i to time i+3) is made greater than the transmit power of symbols in a period in which modulated signals A, B, C, and D are transmitted (from time i+4 to time i+7).

Waveforms relating to modulated signals A through D shown in FIG. 31 are modulated signal A, B, C, and D pilot symbol and data symbol waveforms. The composite signal in FIG. 31 shows the waveform of the composite signal of modulated signals A, B, C, and D. Here, time i in FIG. 31 is a time corresponding to transmission time i. As shown in FIG. 31, the pilot symbol operating range when only modulated signal A is transmitted (from time i to time i+3) is assumed to be −256 to 256, for example, and the symbol operating range when modulated signals A, B, C, and D are transmitted (from time i+4 to time i+7) is assumed to be −64 to 64, for example.

Then, as shown in the figure, the composite signal has an operating range of −256 to 256 when only modulated signal A is transmitted (from time to time i+3), and also has an operating range of −256 to 256 when modulated signals A, B, C, and D are transmitted (from time i+4 to time i+7), and thus the ratio of the above two operating ranges is 1. This value is not exact, but, in comparison with FIG. 30, the ratio of the above two operating ranges approaches 1.

Appropriately changing the pilot symbol transmit power when only modulated signal A is transmitted (when transmitting from only one antenna) in this way so that the composite signal operating range is stabilized enables the time taken for AGC gain control to be lengthened, and quantization error in the A/D conversion section of the receiving apparatus to be reduced. As a result, the data symbol separation precision and reception quality of modulated signals A, B, C, and D improve.

Also, at this time, the transmit power of signal detection symbol 2701 (time i), gain control symbol 2702 (time i+1), frequency offset estimation symbol 2703 (time i+2), and transmission method information symbol 2704 (time i+3) transmitted from only one antenna is greater than the transmit power of signal detection symbol 2701 (time i), gain control symbol 2702 (time i+1), frequency offset estimation symbol 2703 (time i+2), and transmission method information symbol 2704 (time i+3) contained in modulated signal A in FIG. 30, enabling the estimation precision of these four symbols 2701 through 2704 to be improved and quantization error to be reduced.

Thus, according to this embodiment, in a system in which the number of simultaneously transmitted modulated signals is varied, the time taken for AGC gain control can be lengthened, and quantization error in the A/D conversion section can be reduced, by adjusting the modulated signal level when transmitting only one modulated signal so as to match the composite signal level in the receiving apparatus according to the number of modulated signals transmitted. As a result, radio wave propagation environment estimation precision and data reception quality improve. Moreover, the transmit power of pilot symbols contained in a modulated signal when only one modulated signal is transmitted also increases at this time, and therefore the precision of frequency offset estimation and transmission method information estimation using pilot symbols improves, and data reception quality improves.

Embodiment 4

In this embodiment, descriptions are given relating to the method whereby pilot symbol and modulated signal transmit power is changed according to the number of antennas that simultaneously transmit modulated signals (the number of modulated signals) described in Embodiments 1,2, and 3, and relating to the pilot symbol signal point arrangement method. Specifically, in this embodiment, a method is described whereby the PAPR is reduced on the receiving side, and the receiving-side dynamic range can be stabilized, by changing the signal point arrangement of gain control symbols among the pilot symbols for each transmitting antenna.

In this embodiment, a new signal point arrangement method is described for the signal point arrangement of modulated signals described in Embodiment 1 using FIG. 6 and FIG. 10. Other details are the same as in Embodiments 1,2, and 3, and descriptions thereof are omitted here.

First, the case in which there are two transmitting antennas will be described. In Embodiment 1, a BPSK modulated signal is used for pilot symbols as shown in FIG. 6. The reason for using BPSK modulation here is that it is a modulation method with the simplest processing and a low error rate. This is an effective modulation method for symbols whose data is different in every transmission, such as transmission method information symbol 2704 described in Embodiment 3 (shown in FIG. 29A through FIG. 29D).

However, a case will be considered in which BPSK modulation is applied to gain control symbol 2702 described in Embodiment 3 (shown in FIG. 29A through FIG. 29D). Since gain control symbol 2702 is a symbol whose purpose is gain control, it may always be sent with the same pattern in every transmission. Therefore, a transmission pattern for each modulated signal should be decided on that enables gain control to be performed easily.

Figure 32:
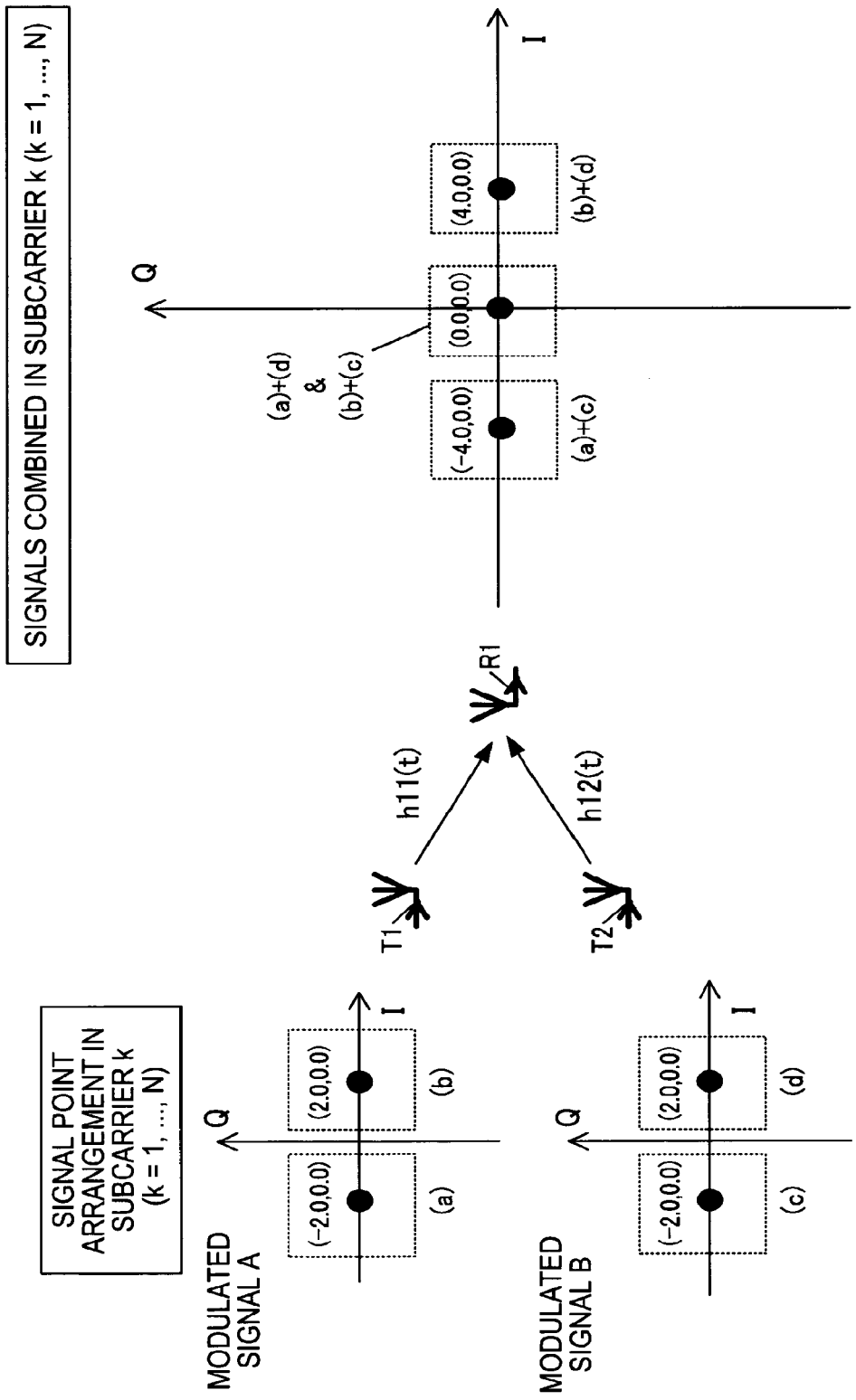
FIG. 32 is a drawing showing signal point arrangements of modulated signals A and B, and a sample signal point arrangement of a composite signal of modulated signals A and B.

FIG. 32 shows an example of signal point arrangements in the in-phase I-quadrature Q plane of each symbol of subcarrier k (k=1, . . . , N, where N is the number of FFT points) when modulated signals A and B are OFDM signals, and the signal point arrangement of a composite signal in which modulated signals A and B are received. The figure shows a case in which the effect of noise is not considered and channel estimation is assumed to be performed ideally.

In FIG. 32, modulated signals A and B use the same signal point arrangement for both amplitude and phase. Looking at the composite signal in FIG. 32, there are two points with large signal point amplitude, their amplitude being 4 (the two points (4.0,0.0) and (−4.0,0.0)). There are also two points with small signal point amplitude, their amplitude being 0 (the two points overlapping at (0.0,0.0)). The dynamic range evaluated by amplitude is thus 4.

Figure 33:
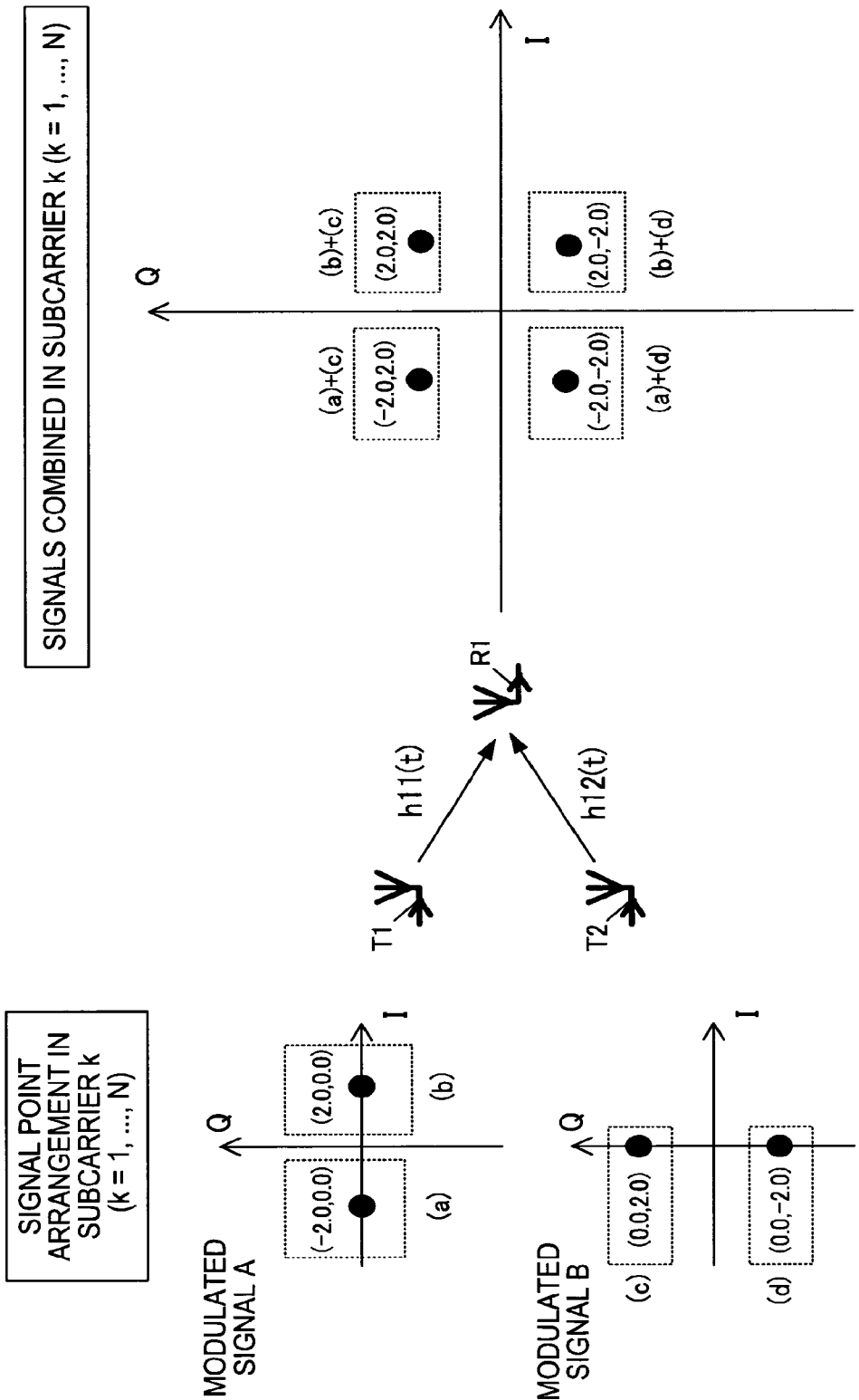
FIG. 33 is a drawing showing signal point arrangements of modulated signals A and B, and a sample signal point arrangement of a composite signal of modulated signals A and B, when only the phase of the signal point arrangement of modulated signal B is rotated through 90°.

On the other hand, FIG. 33 shows the signal point arrangement of modulated signal B with the amplitude unchanged and only the phase rotated through 90°. Looking at the signal point arrangement of the composite signal at this time, it can be seen that the amplitude of all four points is 2√2 (approximately 2.8), the dynamic range evaluated by amplitude is 2.8, and the PAPR is small.

By changing the signal point arrangement for each modulated signal in this way, the PAPR can be made smaller, and gain control can be performed more easily, than when such changes are not made.

Figure 34:
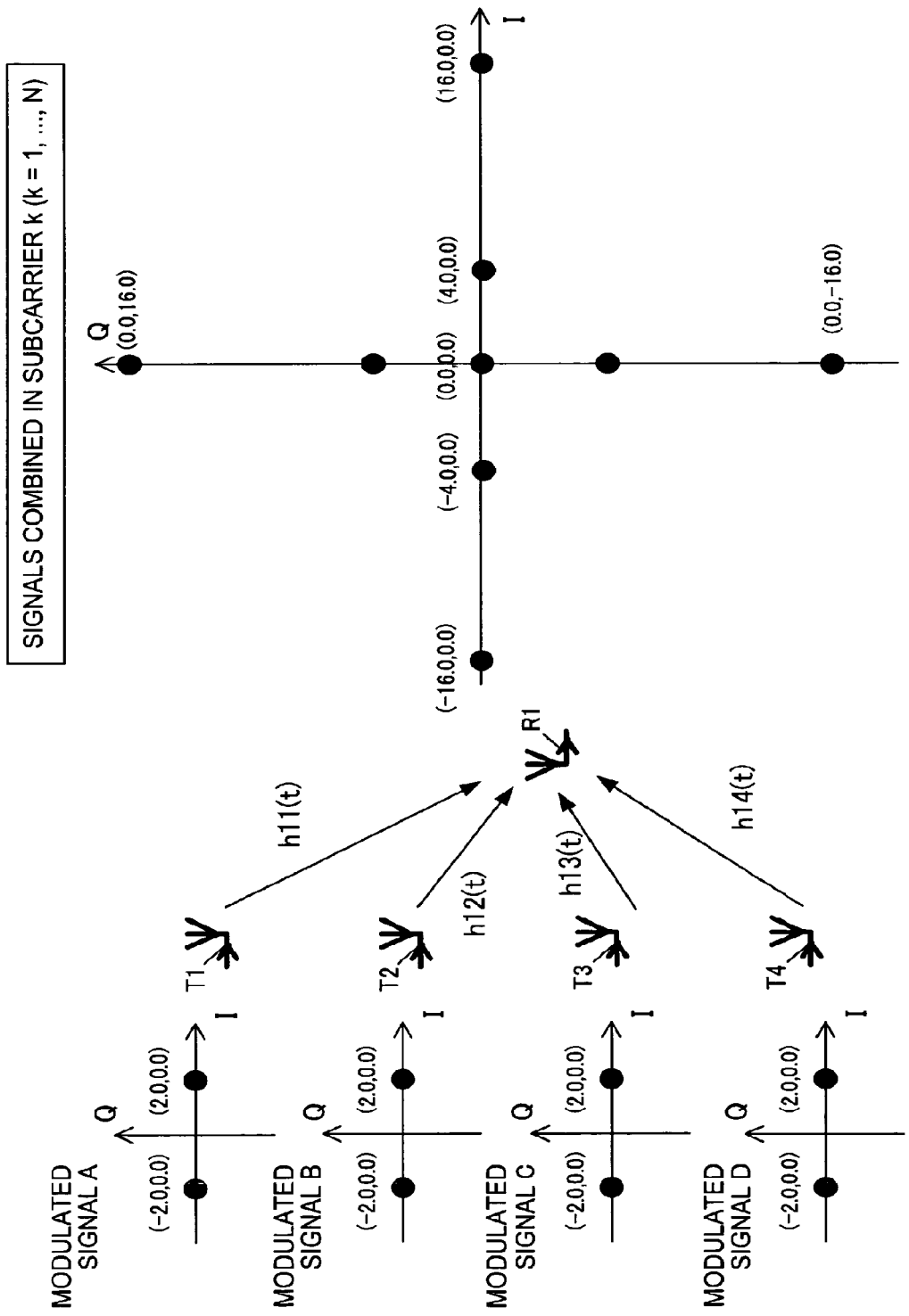
FIG. 34 is a drawing showing signal point arrangements of modulated signals A through D, and a sample signal point arrangement of a composite signal of modulated signals A through D.

FIG. 34 and FIG. 35 show examples of signal point arrangements in the in-phase I-quadrature Q plane of each symbol of subcarrier k (k=1, . . . , N, where N is the number of FFT points) when four modulated signals A through D are OFDM signals, and the signal point arrangement of a composite signal in which modulated signals A, B, C, and D are received. The figures show cases in which the effect of noise is not considered and channel estimation is assumed to be performed ideally.

FIG. 34 shows a case in which modulated signals A, B, C, and D are transmitted using the same signal point arrangement, and FIG. 35 shows a case in which modulated signals A, B, C, and D are transmitted using different signal point arrangements. In FIG. 34 the dynamic range evaluated by the amplitude of the composite signal is 16, while in FIG. 35 the dynamic range evaluated by the amplitude of the composite signal is held down to 4√2 (approximately 5.6). When a method is used whereby the signal point arrangement is changed for each modulated signal in gain control symbols in this way, an effect is obtained of further stabilizing the dynamic range as the number of modulated signals increases.

Figure 36:
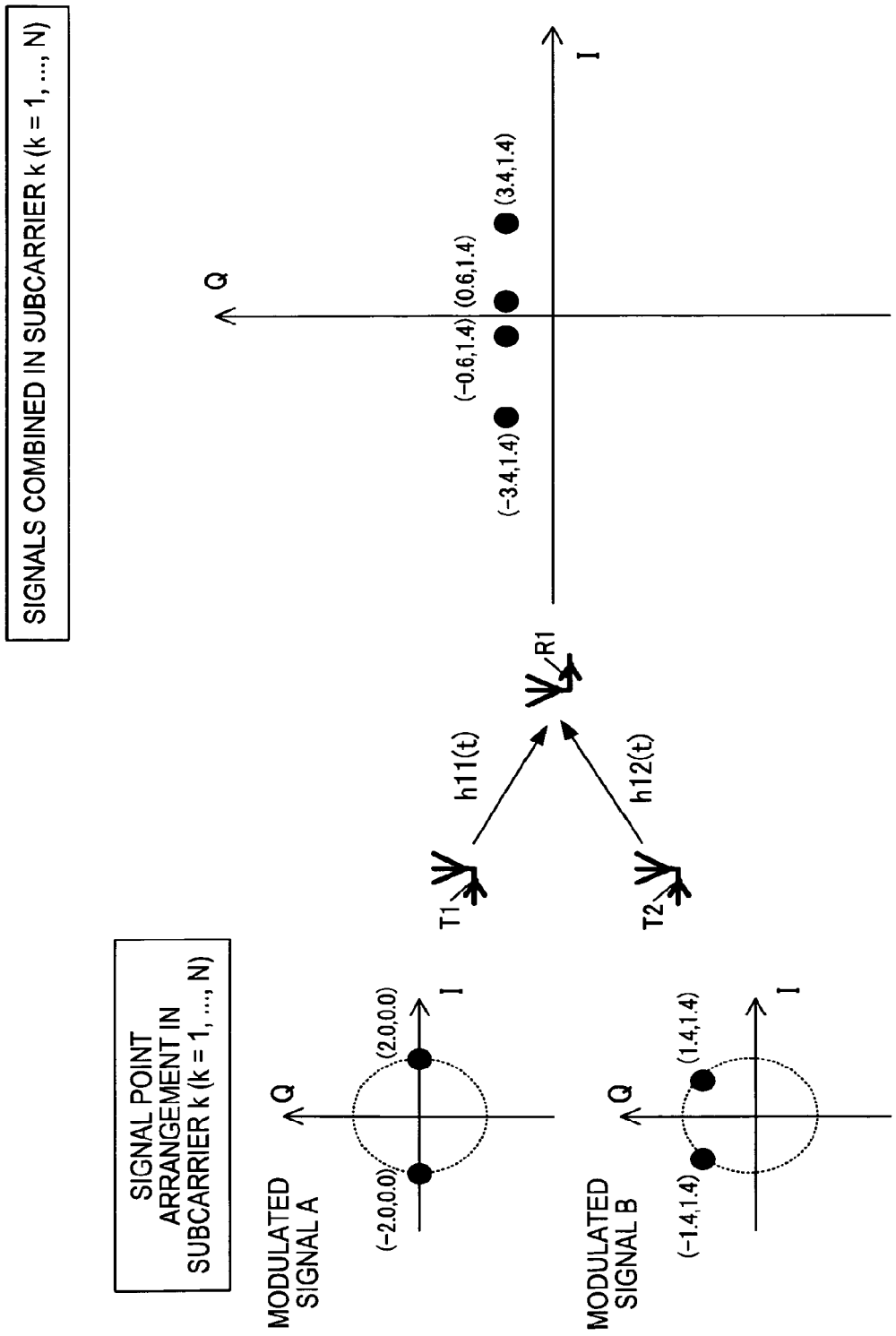
FIG. 36 is a drawing showing signal point arrangements of modulated signals A through D, and a sample signal point arrangement of a composite signal of modulated signals A through D, when modulated signals A, B, C, and D are transmitted using different signal point arrangements.

In this embodiment, a description has been given using the two patterns shown in FIG. 33 as modulated signal patterns, but the present invention is not limited to these patterns, and it is only necessary for the pattern to be changed for each modulated signal so that the PAPR decreases in the composite signal. Thus, transmission can be performed by means of BPSK signals that do not have a 180° phase difference, as shown in FIG. 36. Comparing the composite signal in this case with the composite signals in FIG. 32 and FIG. 36, it can be seen that points with an amplitude of 4 ((4.0,0.0) and (−4.0,0.0)) are made approximately 3.7 ((3.4,1.4) and (−3.4, 1.4)), and the dynamic range can be made smaller.

Also, in this embodiment, a method has been described whereby a BPSK modulation signal point arrangement is changed for gain control symbols. To repeat what has already been stated, since gain control symbols are symbols whose purpose is gain control, the error rate in demodulating the symbols is totally irrelevant. Considering this point, it can be said that the same kind of PAPR reduction effect can be obtained, and the dynamic range can be reduced, by using M-ary modulation for each modulated signal and performing transmission using a different transmission pattern for each modulated signal. In this case a modulation method without amplitude variation, such as PSK modulation, for example, is suitable for M-ary modulation, and the higher the M-ary value (8PSK→16PSK→32PSK . . . ), the more random is the phase in each modulated signal, enabling the dynamic range to be made smaller. Therefore, an M-ary value should be selected that gives the desired dynamic range.

Thus, according to this embodiment, in a system in which the number of simultaneously transmitted modulated signals is varied, a PAPR reduction effect can be obtained, the dynamic range can be made smaller, and quantization error in the A/D conversion section can be reduced, by using a different signal point arrangement in each modulated signal for gain control symbols.

Other Embodiments

In the above embodiments, cases have been described in which the frame configurations of modulated signals A through D are as shown in FIG. 5A, FIG. 5B, FIG. 9A through FIG. 9D, and FIG. 29A through FIG. 29D, but modulated signal frame configurations are not limited to these examples.

Also, in the above embodiments, cases have been described in which frame configuration signal generation section 507 and modulation sections 502A through 502D are used as modulated signal number setting section 11, and the number of transmit modulated signals is set in accordance with transmission method request information S10, but the present invention is not limited to this arrangement, and the number of transmit modulated signals may also be set by the station itself. For example, it is possible to set a larger number of transmit modulated signals when there is a large amount of data to be sent, and a smaller number of transmit modulated signals when there is a small amount of data to be sent. The essential point is that it should be possible to set the number of modulated signals transmitted using a plurality of antennas.

In above-described Embodiment 1, a case has been described in which pilot symbol mapping section 512 such as shown in FIG. 16 is used as transmission power changing section 12, but a transmission power changing section of the present invention is not limited to this case, and the essential point is that it should be possible to change the ratio of data symbol transmit power to pilot symbol transmit power according to the number of transmit modulated signals.

In above-described Embodiment 2, a case has been described in which gain control sections 701A through 701D (FIG. 28) are used as transmission power changing section 12, but a transmission power changing section of the present invention is not limited to this case, and the essential point is that it should be possible to change the transmit power of each modulated signal at the same time as the number of transmit modulated signals is switched.

In the above-described embodiments, cases have been described in which, in a radio transmitting apparatus equipped with four transmitting antennas T1 through T4, the number of antennas (the number of transmit modulated signals) is switched between two and four, or between one and four, but the present invention is not limited to these cases, and can be widely applied to the transmission of n modulated signals by n transmitting antennas. Furthermore, it is not necessary for the number of transmitting antennas and the number of modulated signals transmitted to be the same, and it is also possible to make the number of transmitting antennas larger than the number of transmit modulated signals, select transmitting antennas, and transmit modulated signals from the selected transmitting antennas. Also, a single antenna section may be formed by a plurality of antennas.

In the above embodiments, a radio transmitting apparatus that performs OFDM has been described by way of example, but the present invention is not limited to this case, and can be similarly implemented using a multicast system or single-carrier system. Furthermore, a spread spectrum communication system may also be used. In particular, the present invention can be similarly implemented by application to a system combining an OFDM system and spread spectrum system.

Coding has not been particularly touched on in the above embodiments, but the present invention can be implemented in a case where space-time coding is not performed, and can also be similarly implemented by applying the space-time block codes described in "Space-Time Block Codes from Orthogonal Design" IEEE Transactions on Information Theory, pp. 1456-1467, vol. 45, no. 5, July 1999, and the space-time trellis codes described in "Space-Time Block Codes for High Data Rate Wireless Communication: Performance Criterion and Code Construction" IEEE Transactions on Information Theory, pp. 744-765, vol. 44, no. 2, March 1998.

When changing the modulated signal transmit power when OFDM signals are transmitted from antennas as modulated signals, modulated signal transmit power may be changed by changing the transmit power of each subcarrier, or transmit power may be changed by changing the number of subcarriers used.

Figure 37:
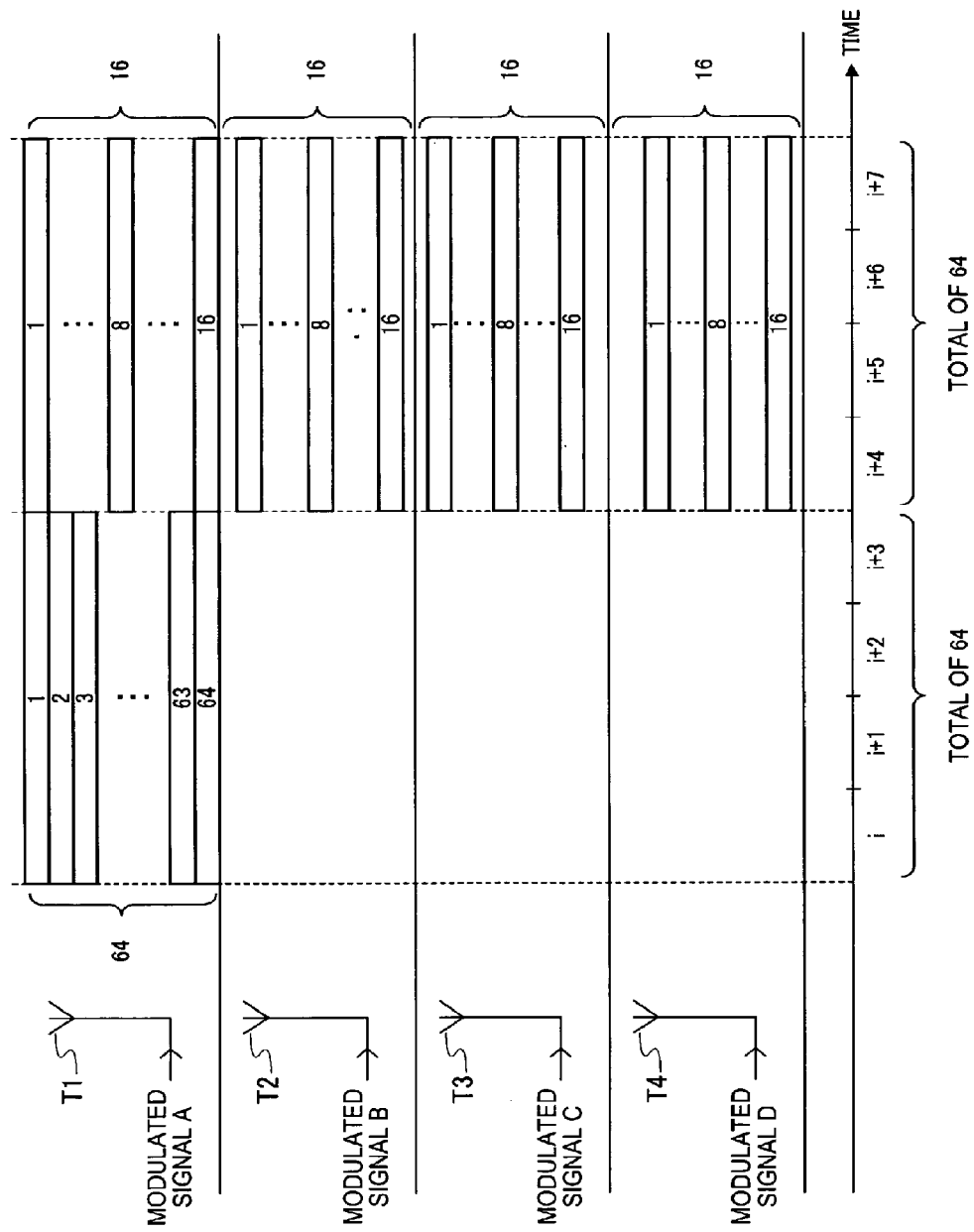
FIG. 37 is a drawing showing an example in which the transmit power of modulated signals is changed by changing the number of subcarriers used.

A case in which the number of subcarriers used is changed will be explained briefly using FIG. 37. FIG. 37 shows a specific example for creating the kind of power waveforms shown in FIG. 31 described in Embodiment 3, and presupposes a case in which modulated signals A through D are each formed from 64 subcarriers. In the period covering time i through time i+3, modulated signal A is transmitted from antenna T1 using all 64 subcarriers. On the other hand, in the period covering time i+4 through time i+7, modulated signals A through D are transmitted from antennas T1 through T4 using 16 subcarriers each. If it is assumed here that the transmit power per subcarrier is the same, power waveforms such as shown in FIG. 31 can be obtained. Since the number of subcarriers used is 64 in both the period from time i through time i+3 and the period from time i+4 through time i+7, the transmit power of the composite signal in the period from time i through time i+3, and the transmit power of the composite signal in the period from time i+4 through time i+7, are equal.

The essential point is that, in a case in which the number of subcarriers used is changed, the number of subcarriers used in each modulated signal (OFDM signal) should be decreased as the number of antennas transmitting modulated signals increases (as the number of modulated signals multiplexed increases). Here, a used subcarrier means a subcarrier in which a symbol whose signal point in the I-Q plane is not (0,0) is placed. With BPSK, for example, this means a subcarrier in which a (1,0) or (−1,0) symbol is placed. Conversely, an unused subcarrier means a subcarrier in which a symbol with a (0,0) signal point is placed.

Also, when OFDM signals are transmitted from antennas as modulated signals, the total transmit power of modulated signals transmitted from a plurality of antennas may be changed by combined use of both the method whereby the transmit power of each subcarrier is changed, and the method whereby the number of subcarriers used is changed.

The present invention is not limited to the above-described embodiments, and various variations and modifications may be possible without departing from the scope of the present invention.

According to one aspect of a radio transmitting apparatus of the present invention, a configuration is employed that includes a plurality of antennas, a modulated signal number setting section that sets the number of modulated signals transmitted using a plurality of antennas, and a transmit power changing section that changes the transmit power of the modulated signals according to the number of transmit modulated signals.

According to this configuration, variation of the level of a composite signal of the modulated signals that occurs when the number of transmit modulated signals is changed can be made small, enabling quantization error of the receiving apparatus to be reduced. Also, since complex transmit power control is not performed, and transmit power is simply changed according to the number of transmit modulated signals, quantization error can be reduced by means of a simple configuration.

According to one aspect of a radio transmitting apparatus of the present invention, a configuration is employed wherein the transmit power changing section has a pilot symbol forming section, and that pilot symbol forming section changes the signal point arrangement when a pilot symbol is formed so that the ratio of data symbol transmit power to pilot symbol transmit power changes according to the number of transmit modulated signals.

According to this configuration, since the signal point arrangement when a pilot symbol is formed is changed so that the ratio of data symbol transmit power to pilot symbol transmit power changes according to the number of transmit modulated signals corresponding to the degree of multiplexing of data symbols, the pilot symbol signal level can be made to match the data symbol composite signal level. As a result, pilot symbol quantization error can be reduced, the precision of radio wave propagation environment estimation, time synchronization, and frequency offset estimation using pilot symbols improves, and consequently data reception quality improves.

According to one aspect of a radio transmitting apparatus of the present invention, a configuration is employed wherein the pilot symbol forming section decides the signal point arrangement of pilot symbols in accordance with the combined transmit power of data symbols transmitted simultaneously.

According to this configuration, the pilot symbol signal level can be dependably aligned with the data symbol composite signal level, and pilot symbol quantization error can be dependably reduced.

According to one aspect of a radio transmitting apparatus of the present invention, a configuration is employed wherein the pilot symbol forming section selects a signal point arrangement so that the pilot symbol signal point amplitude increases the greater the number of transmit modulated signals.

According to one aspect of a radio transmitting apparatus of the present invention, a configuration is employed wherein the pilot symbol forming section decides the signal point arrangement based on the ratio of the number of simultaneously transmitted pilot symbols to the number of simultaneously transmitted data symbols.

According to this configuration, since the pilot symbol signal point arrangement is decided and pilot symbol transmit power changed based on the ratio of the respective degrees of multiplexing of pilot symbols and data symbols, the pilot symbol signal level can be dependably aligned with the data symbol composite signal level, and pilot symbol quantization error can be dependably reduced.

According to one aspect of a radio transmitting apparatus of the present invention, a configuration is employed wherein the transmit power changing section changes the transmit power of each modulated signal at the same time as the number of transmit modulated signals is switched to a number set by the modulated signal number setting section.

According to this configuration, variation of the modulated signal composite signal level before switching of the number of transmit modulated signals and immediately after switching of the number of transmit modulated signals can be eliminated, enabling quantization error occurring immediately after switching of the number of transmit modulated signals in the receiving apparatus to be reduced.

According to one aspect of a radio transmitting apparatus of the present invention, a configuration is employed wherein the transmit power changing section makes the transmit power of each modulated signal smaller when the number of transmit modulated signals increases.

According to this configuration, an increase in the modulated signal composite signal level due to an increase in the number of transmit modulated signals can be suppressed, and quantization error in the receiving apparatus occurring immediately after the number of transmit modulated signals is increased can be reduced.

According to one aspect of a radio transmitting apparatus of the present invention, a configuration is employed wherein the transmit power changing section makes the transmit power of each modulated signal larger when the number of transmit modulated signals decreases.

According to this configuration, a decrease in the modulated signal composite signal level due to a decrease in the number of transmit modulated signals can be suppressed, and quantization error in the receiving apparatus occurring immediately after the number of transmit modulated signals is decreased can be reduced.

According to one aspect of a radio transmitting apparatus of the present invention, a configuration is employed wherein the transmit power changing section gradually restores the changed transmit power of each modulated signal to its value prior to switching of the number of modulated signals.

According to this configuration, since the transmit power of each modulated signal is gradually restored to its value prior to switching of the number of modulated signals, it is possible for gain control by the transmitting apparatus to keep pace, and hardly any quantization error occurs. Also, since the transmit power of each modulated signal is restored to its original value for which a good SIR (Signal to Interference Ratio) can be obtained, modulated signal reception quality improves.

As described above, according to the present invention, in a system in which the number of simultaneously transmitted modulated signals is changed according to the propagation environment and so forth a radio transmitting apparatus and radio transmission method can be implemented that enable pilot symbol and data symbol quantization error to be reduced and reception quality to be improved.

This application is based on Japanese Patent Application No. 2003-289060 filed on Aug. 7, 2003, and Japanese Patent Application No. 2004-71322 filed on Mar. 12, 2004, the entire content of which is expressly incorporated by reference herein.

INDUSTRIAL APPLICABILITY

The present invention is particularly suitable for application to a radio communication system in which different modulated signals are transmitted simultaneously from a plurality of antennas, and the number of these simultaneously transmitted modulated signals is varied.

The invention claimed is:
1. A wireless communications method comprising:
receiving a plurality of modulated signals from at least one antenna, with at least one modulated signal from among the plurality thereof including, in a predetermined order, a frequency offset estimation signal, a channel fluctuation estimation signal, a first gain control signal, and a second gain control signal;
controlling a gain of the at least one modulated signal based upon the first and second gain control signals;
adjusting a frequency offset of the at least one modulated signal based upon the frequency offset estimation signal;
estimating a channel fluctuation of the at least one modulated signal where the frequency offset is adjusted, based upon the channel fluctuation estimation signal;

separating the at least one modulated signal from the received plurality of modulated signals where the frequency offset is adjusted based upon the estimated channel fluctuation; and demodulating the separated at least one modulated signal.

2. The wireless communications method according to claim 1 wherein the predetermined order comprises the first gain control signal being arranged ahead of the frequency offset estimation signal, and the second gain control signal being arranged subsequent to the frequency offset estimation signal and ahead of the channel fluctuation estimation signal.

3. The wireless communications method according to claim 1 wherein receiving the plurality of modulated signals from at least one antenna comprises receiving the plurality of modulated signals from a plurality of antennae with each modulated signal being received from a respective antenna.

4. The wireless communications method according to claim 1, wherein the at least one modulated signal comprises an orthogonal frequency division multiplexing signal.

5. The wireless communications method according to claim 1, wherein the frequency offset estimation signal, channel fluctuation estimation signal, first gain control signal, and second gain control signal are arranged in a preamble.

6. The wireless communications method according to claim 1, wherein the frequency offset estimation signal, channel fluctuation estimation signal, first gain control signal, and second gain control signal are arranged in at least one pilot symbol.

7. The wireless communications method according to claim 1, wherein the frequency offset estimation signal, channel fluctuation estimation signal, first gain control signal, and second gain control signal are arranged in at least one unique word.

8. A wireless communications method comprising:
receiving a plurality of modulated signals, with at least one modulated signal from among the plurality thereof including, in a predetermined order, a frequency offset estimation signal, a channel fluctuation estimation signal, at least one gain control signal;
controlling a gain of the at least one modulated signal based upon the at least one gain control signal;
adjusting a frequency offset of the at least one modulated signal based upon the frequency offset estimation signal;
estimating a channel fluctuation of the at least one modulated signal where the frequency offset is adjusted, based upon the channel fluctuation estimation signal;
separating the at least one modulated signal from the received plurality of modulated signals where the frequency offset is adjusted based upon the estimated channel fluctuation; and
demodulating the separated at least one modulated signal.

9. The wireless communications method according to claim 8 wherein the at least one gain control signal comprises first and second gain control signals; and wherein the predetermined order comprises the first gain control signal being arranged ahead of the frequency offset estimation signal, and the second gain control signal being arranged subsequent to the frequency offset estimation signal and ahead of the channel fluctuation estimation signal.

10. The wireless communications method according to claim 8, wherein receiving the plurality of modulated signals comprises receiving each modulated signal from a respective antenna.

11. The wireless communications method according to claim 8, wherein the at least one modulated signal comprises an orthogonal frequency division multiplexing signal.

12. The wireless communications method according to claim 8, wherein the frequency offset estimation signal, channel fluctuation estimation signal, and the at least one gain control signal are arranged in a preamble.

13. The wireless communications method according to claim 8, wherein the frequency offset estimation signal, channel fluctuation estimation signal, and the at least one gain control signal are arranged in at least one pilot symbol.

14. The wireless communications method according to claim 8, wherein the frequency offset estimation signal, channel fluctuation estimation signal, and the at least one gain control signal are arranged in at least one unique word.

15. A wireless communications device comprising:
a receiver section configured to
receive a plurality of modulated signals, with at least one modulated signal from among the plurality thereof including, in a predetermined order, a frequency offset estimation signal, a channel fluctuation estimation signal, at least one gain control signal,
control a gain of the at least one modulated signal based upon the at least one gain control signal,
adjust a frequency offset of the at least one modulated signal based upon the frequency offset estimation signal,
estimate a channel fluctuation of the at least one modulated signal where the frequency offset is adjusted, based upon the channel fluctuation estimation signal,
separate the at least one modulated signal from the received plurality of modulated signals where the frequency offset is adjusted based upon the estimated channel fluctuation, and
demodulate the separated at least one modulated signal.

16. The wireless communications device according to claim 15, wherein the at least one gain control signal comprises first and second gain control signals; and wherein the predetermined order comprises the first gain control signal being ahead of the frequency offset estimation signal, and the second gain control signal being subsequent to the frequency offset estimation signal and ahead of the channel fluctuation estimation signal.

17. The wireless communications device according to claim 15, further comprising a plurality of antennas; and wherein said receiver section is configured to receive the plurality of modulated signals by receiving each modulated signal from a respective antenna of said plurality thereof.

18. The wireless communications device according to claim 15, wherein the at least one modulated signal comprises an orthogonal frequency division multiplexing signal.

19. The wireless communications device according to claim 15, wherein the frequency offset estimation signal, channel fluctuation estimation signal, and the at least one gain control signal are arranged in a preamble.

20. The wireless communications device according to claim 15, wherein the frequency offset estimation signal, channel fluctuation estimation signal, and the at least one gain control signal are arranged in at least one pilot symbol.

21. The wireless communications device according to claim 15, wherein the frequency offset estimation signal, channel fluctuation estimation signal, and the at least one gain control signal are arranged in at least one unique word.

* * * * *